US010123157B2

(12) United States Patent
Appleby et al.

(10) Patent No.: US 10,123,157 B2
(45) Date of Patent: Nov. 6, 2018

(54) LOCATING UNDERGROUND MARKERS

(71) Applicant: Orica International Pte Ltd, Singapore (SG)

(72) Inventors: Rodney Appleby, Singapore (SG); David Thiel, Singapore (SG); Michael Maggs, Singapore (SG); Alex Spathis, Singapore (SG)

(73) Assignee: ORICA INTERNATIONAL PTE LTD, Singapore (SG)

( * ) Notice: Subject to any disclaimer, the term of this patent is extended or adjusted under 35 U.S.C. 154(b) by 520 days.

(21) Appl. No.: 14/436,209

(22) PCT Filed: Oct. 10, 2013

(86) PCT No.: PCT/AU2013/001171
§ 371 (c)(1),
(2) Date: Apr. 16, 2015

(87) PCT Pub. No.: WO2014/059468
PCT Pub. Date: Apr. 24, 2014

(65) Prior Publication Data
US 2015/0281881 A1   Oct. 1, 2015

(30) Foreign Application Priority Data

Oct. 19, 2012   (AU) .................................. 2012904599

(51) Int. Cl.
*H04W 4/02*   (2018.01)
*G06F 3/0484*   (2013.01)
(Continued)

(52) U.S. Cl.
CPC ............... *H04W 4/02* (2013.01); *E21C 39/00* (2013.01); *E21F 17/185* (2013.01); *F42D 3/00* (2013.01);
(Continued)

(58) Field of Classification Search
None
See application file for complete search history.

(56) References Cited

U.S. PATENT DOCUMENTS 2,992,325 A   7/1961   Lehan
6,728,545 B1   4/2004   Belcea
(Continued)

FOREIGN PATENT DOCUMENTS

WO   WO 2008/141465 A1   11/2008
WO   WO 2008/144811 A1   12/2008
WO   WO 2009/118762 A1   10/2009

OTHER PUBLICATIONS

Fitzgerald, M., York, S., Cooke, D., Thornton, D., "Blast Monitoring and Blast Translation—Case Study of a Grade Improvement Project at the Fimiston Pit, Kalgoorlie, Western Australia", 8th International Mining Geology Conference, Queenstown, pp. 285-297, New Zealand Aug. 22-24, 2011.*
(Continued)

*Primary Examiner* — Joseph Schoenholtz
(74) *Attorney, Agent, or Firm* — Daly, Crowley Mofford & Durkee, LLP

(57) ABSTRACT

A process for locating underground markers, including: transmitting signals through the ground between markers in the ground; and determining locations of the markers based on the transmitted signals.

19 Claims, 14 Drawing Sheets

(51) Int. Cl.
| | |
|---|---|
| *G01S 5/18* | (2006.01) |
| *G01V 1/30* | (2006.01) |
| *G01V 1/22* | (2006.01) |
| *G01V 3/12* | (2006.01) |
| *F42D 5/02* | (2006.01) |
| *E21F 17/18* | (2006.01) |
| *E21C 29/00* | (2006.01) |
| *F42D 3/00* | (2006.01) |
| *E21C 39/00* | (2006.01) |

(52) U.S. Cl.
CPC .................. *F42D 5/02* (2013.01); *G01S 5/18* (2013.01); *G01V 1/22* (2013.01); *G01V 1/30* (2013.01); *G01V 3/12* (2013.01); *G06F 3/04842* (2013.01)

(56) References Cited

U.S. PATENT DOCUMENTS

| | | | | |
|---|---|---|---|---|
| 8,787,840 | B2* | 7/2014 | Srinivasan | H04W 52/0245 370/216 |
| 9,541,630 | B2* | 1/2017 | Brown | G01S 5/0289 |
| 2004/0102219 | A1 | 5/2004 | Bunton et al. | |
| 2004/0233855 | A1* | 11/2004 | Gutierrez | H04L 45/00 370/252 |
| 2005/0012499 | A1* | 1/2005 | La Rosa | E21B 47/02 324/207.15 |
| 2005/0099985 | A1* | 5/2005 | Callaway | G08C 17/00 370/338 |
| 2006/0178847 | A1 | 8/2006 | Glancy et al. | |
| 2008/0049672 | A1* | 2/2008 | Barak | H04L 5/0023 370/330 |
| 2008/0114548 | A1* | 5/2008 | Pavel | G01V 1/223 702/14 |
| 2009/0204327 | A1* | 8/2009 | Lu | G01V 3/083 702/7 |
| 2010/0225155 | A1* | 9/2010 | Spathis | E21C 37/16 299/13 |
| 2010/0298999 | A1* | 11/2010 | Allgaier | G06F 1/3203 700/296 |
| 2012/0074931 | A1* | 3/2012 | Pienaar | G01B 7/003 324/207.22 |
| 2012/0138291 | A1* | 6/2012 | Tomberlin | E21B 47/026 166/254.2 |

OTHER PUBLICATIONS

Bar-Noy, Amotz, et al. "More Is More: The Benefits of Dense Sensor Deployment." 2008 5th IEEE International Conference on Mobile Ad Hoc and Sensor Systems, 2008.*
"Networked Smart Marker System" downloaded from URL<http://www.elexonmining.com/networked-smart-markers-2/> on Aug. 8, 2017.*
Thornton, D.M., The Application of Electronic Monitors to Understand Blast Movement Dynamics and Improve Blast Designs, 2009, downloaded from URL<http://www.bmt.com.au/wp-content/uploads/2015/12/2009_FragBlastpdf> on Aug. 8, 2017.*
Engmann, E., et. al., "Measurement and Modelling of Blast Movement to Reduce Ore Losses and Dilution at Ahafo Gold Mine in Ghana", (2013), Ghana Mining Journal, pp. 27-36.*
Remote Data Transfer (RDT) Unit, downloaded from URL<http://www.bmt.com.au/en/remote-data-transfer-rdt-unit/> on Aug. 8, 2017.*
Networked Smart Marker System, Elexon Mining, downloaded from URL<http://www.elexonmining.com/networked-smart-markers-2/> on Aug. 8, 2017.*
Notification of Transmittal of the International Search Report and the Written Opinion of the International Searching Authority, or the Declaration, PCT/AU2013/001171, dated Oct. 29, 2013, 8 pages.
Notification of Transmittal of International Preliminary Report on Patentability, PCT/AU2013/001171, dated Jan. 29, 2015, 8 pages.

* cited by examiner

LOCATING UNDERGROUND MARKERS

CROSS REFERENCE TO RELATED APPLICATIONS

This application is a National Stage Application of PCT Patent Application No. PCT/AU2013/001171 filed Oct. 10, 2013, entitled: "LOCATING UNDERGROUND MARKERS," which claims the benefit of Australian Patent Application No. 2012904599, filed on Oct. 19, 2012, which are incorporated herein by reference.

REFERENCE TO COMPUTER PROGRAM LISTING APPENDIX

Included with this application is a Computer Program Listing Appendix submitted on two compact discs. Each compact disc contains the file "BeforeBlast", created on Jul. 18, 2018 and having a size of 13 KB, the file "AfterBlast", created on Jul. 18, 2018 and having a size of 4 KB, and the file "locate", created on Jul. 18, 2018 and having a size of 21 KB. Each file contained on the submitted compact discs is hereby incorporated by reference in its entirety.

FIELD

The present invention relates to systems, processes and computer-readable storage configured for locating underground markers. Information about the locations of the underground markers can be used to monitor movement of the ground, e.g., for monitoring movement of ore bodies in the ground during blasting.

BACKGROUND

There is a need in many industries to monitor locations and movement of underground structures, e.g., naturally occurring geological formations (e.g., ore bodies) or man-made buried structures (e.g., pipe lines).

For example, in the mining industry, mines are established to extract valuable materials from the ground. The ground generally includes the valuable materials (the ore) mixed with non-valuable materials (the waste rock or gangue). Historically, ore was located only as it became visible during extraction or excavation. In modern mining operations, geologists can determine the location of ore in the ground before mining commences. Geologists can generate three-dimensional geological maps of ore bodies in the ground before the excavation commences, and on an ongoing basis during excavation. Using the geological map, the mining engineers can practice "selective mining". As mining engineers know the location of the ore body in advance, "economic ore" (i.e., at a sufficient concentration in the ground) can be excavated separately from sub-economic ore (which is insufficiently concentrated in the ground). The ore boundaries can be indicated on the ground surface (referred to as the "bench area" in an open-pit mine) to indicate the economic areas and the sub-economic areas. The economic and non-economic areas can be represented by polygons. When the rock is excavated, the rock from the sub-economic polygons can be sent to a waste dump, while rock extracted from the economic polygons can be sent to an ore processing facility.

To enable the rock to be efficiently and conveniently extracted by a digger, the rock requires blasting to break it up into a so-called "muck pile", suitable for digging, loading and transport. During blasting, however, movement can occur in the ground, and the boundaries between the economic and sub-economic regions can move. The location of the ore bodies may then no longer correspond to the locations in the three-dimensional geological map, and it may be difficult to select digging polygons on the bench area that will provide a good separation of the ore from the waste rock. Different blasting techniques are required for each blast, depending on the blast design, blast geometry, bench geology and geometry, and mineralisation geometry. It can be difficult therefore to predict the post-blast locations of all boundaries in the ground based on the pre-blast three-dimensional geological map of the ore body. If the post-blast ore body boundary is not correctly identified, a portion of the valuable ore may be incorrectly transported to the waste dump, while additional waste rock may be transported to the ore processing facility. The loss of ore in mining, and the unnecessary processing of waste material, is referred to as "ore dilution".

There is therefore a need to identify the location of the post-blast ore body boundary in the muck pile as accurately as possible to provide for higher efficiency mining of the ore. There may also be a need to determine the ore boundaries in the muck pile as quickly as possible after blasting to provide for rapid and efficient extraction of the ore.

It is desired to address or ameliorate one or more disadvantages or limitations associated with the prior art, or to at least provide a useful alternative.

SUMMARY

In accordance with the present invention, there is provided a process for locating underground markers, including:
  transmitting signals through the ground between markers in the ground; and
  determining locations of the markers based on the transmitted signals.

The present invention also provides a system for locating underground markers including:
  at least one pair of markers configured to transmit at least one signal between the markers through the ground; and
  at least one computing device configured to determine locations of the markers in the ground based on the at least one transmitted signal.

In embodiments, the markers can be devices which can act as network nodes in a network. The ground can include natural structures (e.g., rocks, geological structures, soil, water, caverns, etc.) and man-made structures (e.g., tunnels, pipes, etc.).

Determining the locations can include determining distances between the markers based on received signal properties (e.g., analogue properties) of the transmitted signals, including signal strengths or amplitudes. Determining the locations can include determining distances between the markers based on received signal properties (e.g., analogue properties) of the transmitted signals, including signal transmission times. The signals can be mechanical signals (which can also be referred to as seismic or acoustic signals), e.g., travelling as vibration waves, strain waves or seismic waves in the ground. The seismic signals can be generated by the markers, generated by components of the markers, generated by sources associated with the markers (e.g., sources containing the markers), and/or generated by separate sources (e.g., external sources such as detonators—referred to as "talking detonators", or sources of impact in or on the ground such as concussive sources like lightning strikes).

Determining the locations can include using trilateration based on the determined distances. Trilateration methods involve the determination of absolute or relative locations of points by measurement of distances Determining the locations can include:
- selecting a modelled location corresponding to each underground marker;
- determining modelled distances between the modelled locations;
- determining an error between each modelled distance and each corresponding determined distance;
- selecting a different modelled location for each modelled location that reduces the one or more corresponding errors; and
- repeating the determination of the modelled distances, the determination of the errors, and the selection of the different modelled locations until an end condition is satisfied.

The end condition can include a minimum value for the errors. The end condition can include a maximum number of iterations of the repeating.

Determining the locations can include modelling connections between the pairs of markers as springs based on Hooke's law, and iteratively determining the locations using a least-squares fitting process of the springs' lengths to the determined distances. The iterative process can include minimising a selected cost function.

Determining the locations can include determining directions between the markers based on respective received signal properties of the transmitted signals, including the signal directions (e.g., based on each signal's direction of arrival or "DOA"), and using triangulation based on the determined directions. Determining the locations can include determining an angular rotation of each marker (e.g., using gyroscope sensors) to the signal directions between the markers.

The transmitted signals can represent marker movements of the markers (e.g., transmitter device information, e.g., from accelerometers), and determining each location uses a pre-movement location and the marker movement of each marker. The transmitted signals can represent geo-location data representing a location of each marker in a coordinate system of a site or of a global positioning system (GPS), and determining each location can include using the geo-location data. The displacement data can represent a displacement, acceleration, velocity and/or duration of each marker movement.

Determining the locations can include identifying one or more of the markers using the transmitted signals, wherein each transmitted signal represents an identifier of a corresponding transmitting marker of the markers.

Determining the locations can include using anchor locations of anchor markers. The anchor locations can be selected to be where negligible ground movement occurs. The anchor locations can be used as preferred modelled locations in a device locating process. In a blasting example, the anchor markers are located outside a blast area, and provide fixed reference points for adjacent ones of the other non-anchor markers to determine their preliminary locations after movement due to the blasting. The adjacent markers are those that can communicate with the anchor nodes. Once the adjacent markers have determined their locations, they can then act as virtual anchor nodes to determine locations of further adjacent markers that are adjacent the closest set of adjacent markers (but not adjacent the actual anchor markers). The process can be performed iteratively, until all markers determine their locations based on the anchor markers.

Determining the locations can include using values of selected ground properties.

The process can include:
- transmitting test signals through the ground between the markers in the ground at selected test locations; and
- determining the values of the selected ground properties based on: received test signal properties (e.g., signal strengths/amplitude or signal delays/phase), of the transmitted test signals; and the selected test locations.

Determining the ground properties values can include determining statistical values of the ground properties using a plurality of the received test signals corresponding to different times of receiving, and/or different locations in the ground, wherein the statistical values include average ground properties values and/or median ground properties values. (The statistical values can include statistical distribution width values, e.g., standard deviation and/of variance).

The process can include:
- determining a variation in ground properties values between the different locations of the markers (e.g., between test pairs of the markers) in the ground; and
- using the average ground properties values or the median ground properties values as the ground properties values if the variation is below a selected threshold.

The process can include dividing the ground into different zones with different geological properties and determining the average or median ground properties values for each zone.

Determining the ground properties values can include manually selecting at least one of the values.

The selected ground properties can relate to electromagnetic ground properties. The electromagnetic properties can include signal attenuation, signal delay, dispersion, impedance, ground conductivity, and/or ground permittivity, and the signals can include propagating electromagnetic signals including very-high frequency (VHF) or ultra-high frequency (UHF) radio-frequency (RF) frequencies (e.g., at about 433 MHz). The electromagnetic properties can include signal attenuation, signal delay, dispersion, impedance and/or magnetic permeability, and the signals include magnetic induction (MI) signals including low-frequency (LF) radio-frequency (RF) frequencies (e.g., at about 100 kHz).

The selected ground properties can include mechanical ground properties, and the signals can include mechanical signals (also referred to as seismic signals, e.g., travelling as vibration waves, strain waves or stress waves in the ground), e.g., including extremely-low frequency (ELF) frequencies (e.g., from 3 Hz to 30 Hz, including around 10 Hz) and/or super low frequency (SLF) frequencies (e.g., from 30 Hz to 300 Hz, including around 80 Hz).

The markers can form nodes in an ad hoc communications network.

Each marker can be provided by a device including: a microcontroller (or microprocessor), computer-readable storage, and a communications transceiver.

At least one emitting marker of the markers can select an emitter power level of the transmitted signal to provide a received power level less than a saturated power level for a corresponding receiving marker. Selecting the emitter power level can include the emitting marker receiving a feedback signal from the receiving marker if the received power level is not less than the saturated power level.

The process can include one or more of the markers entering a sleep mode before transmitting the signals. The process can include: transmitting an activation signal between the markers through the ground; and the markers in the sleep mode exiting the sleep mode in response to receiving the activation signal.

The process can include generating a three-dimensional display of the locations for a graphical user interface (GUI).

The process can include receiving sensor data representing temperatures, pressures, accelerations, geo-location coordinates (e.g., GPS or mine site coordinates), and/or pH levels measured by one or more sensors of at least one of the markers using the transmitted signals. The sensors can be commercially available sensors, and standard protocols can be used for transmitting the sensor data.

The process can include mining or plant equipment (e.g., excavating equipment, ground-engaging equipment, diggers, etc.) receiving location data representing the determined locations, and using the location data during excavation. The location data can be transmitted into an on-board geo-location system to aid digging. The process can include generating an indication of a marker location for an operator of the mining or plant equipment based on the location data. This can allow an operator to determine how close the plant equipment is to the boundary. The process can also include mining or plant equipment fitted with a receiving antenna locating markers whilst digging, e.g., as the receiving equipment comes closer to the marker location and/or more ground or soil is removed, more accurate distance measurements can be achieved, thereby further improving the recovery of the ore.

The process can include generating an indication of a flow of ground material (e.g., excavated rock) through ore transport or plant equipment (e.g., crusher and grinding plant) based on the markers emitting signals, e.g., to improve efficiency. A signal is transmitted through the dynamically moving/flowing material. This rock can be on a conveyor or travelling through a stope. The flowing material can pass through or by a detector (e.g., an antenna or another marker node). In large ore bodies of broken rock, if the markers can communicate with each other, data representing the flow of the ground/rock through the whole system can be generated based on the ad hoc network of the markers.

A process for monitoring ground movement can include:
accessing data representing pre-movement locations of underground markers;
accessing data representing post-movement locations of the markers generated using the above processes; and
generating movement data representing movement of the markers based on differences between the pre-movement locations and the respective post-movement locations.

The generated movement data can be used for monitoring ore movement during blasting. The pre-movement locations can be adjacent edges of ore bodies.

The process can include determining the pre-movement locations using transmission of pre-movement test signals between the markers.

Computer-readable storage for locating underground markers can have stored thereon programming instructions configured to cause at least one processing device to execute at least a portion of the above processes.

Each marker can include a communications transceiver, a microcontroller and computer-readable storage.

The system can include a base station with:
a transceiver configured to send and to receive data to and from at least one of the markers; and
a data communications interface configured to send data to, and to receive data from, the computing device.

The system can include components configured to perform the above-described processes.

BRIEF DESCRIPTION OF THE DRAWINGS

Preferred embodiments of the present invention are hereinafter further described, by way of example only, with reference to the accompanying drawings, in which.

DETAILED DESCRIPTION

Monitoring System 100

Figure 1:
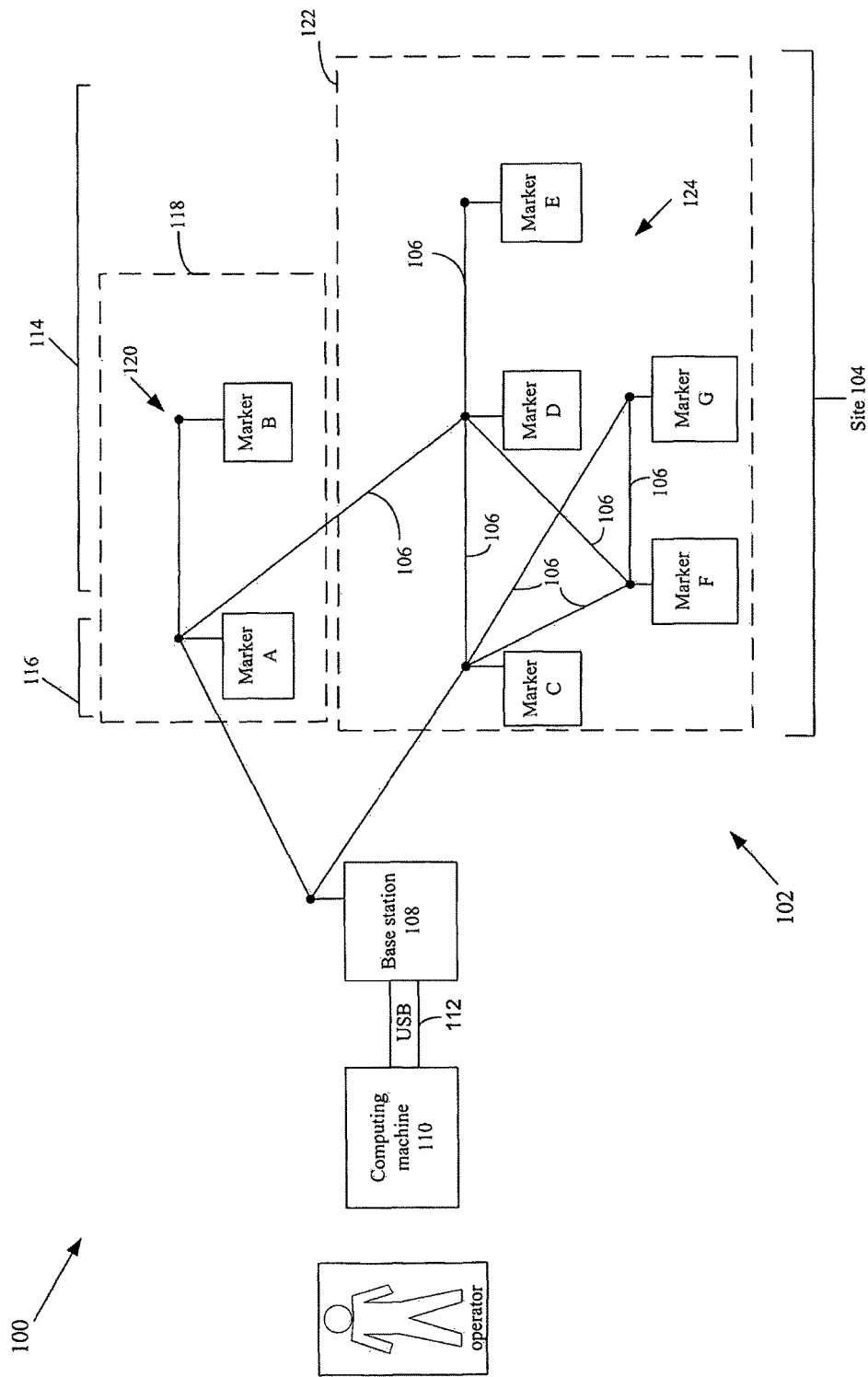
FIG. 1 is a schematic diagram of a monitoring system for locating underground markers.

Described herein is a monitoring system 100 for determining the positions of, or locating, markers 102, at least some of which are underground (i.e., in the ground) in a site 104, as shown in FIG. 1. The locations of the markers 102 are determined in three dimensions, e.g., the location of each marker includes its depth in the ground and a corresponding X-Y location on the surface. The markers 102 transmit signals between each other using wireless communication links 106, which connect the markers 102 (via wireless signal and data connections). The markers 102 communicate with each other and with a base station 108. The base station 108 communicates with a computing machine 110 using a data link 112 (e.g., a universal serial bus connection), and the computing machine 110 determines the locations of the markers based on the transmitted signals (also referred to as "transmission signals") between the markers.

The markers 102 communicate in pairs, referred to as "transmission pairs", "emitting-receiving pairs" or "communicating pairs". In each communicating pair, an emitting marker emits a first wireless transmission signal, which is transmitted via one of the links 106 to a receiving marker through the ground. The receiving marker subsequently generates a further wireless signal for transmission to a different third marker, and the further wireless signal represents at least portions of the first wireless transmission signal. In this way, distant markers 114 of the markers 102, which are too distant from the base station 108 to communicate directly with it, can communicate their information (including location information, identity information, etc.) by connecting to others of the markers 102 (via the links 106) which are closer to the base station 108, and thus eventually to the close markers 116 which can be in direct communication with the base station 108, as shown in FIG. 1. For example, a marker E, as shown in FIG. 1, transmits a signal to a different marker, marker D, which is closer to the base station 108. Marker D in turn transmits a second signal, which partially represents the first signal from marker E, to one of the close markers 116, namely a marker C. The marker C then communicates with the base station 108 by transmitting a signal representing at least portions of the signals emitted by marker E, and the signal emitted by marker D using a link 106. The distant markers 114 can be distant because they are buried at a depth in the ground beyond which only one of the wireless links 106 can extend or reach: thus the distant markers 114 can be buried deep in the site 104, and deeper than the penetration distance of a wireless link 106 into the ground, but still communicate with the base station 108 on the surface of the site 104 by using a plurality of the links 106 (which can be referred to as using a multi-hop communications pathway between one of the distance markers 114 and the base station 108).

By providing the communications links 106 between the distant markers 114 and the close markers 116, the monitoring system 100 can determine the locations of markers 102 that are distant from the base station 108 without any requirement to move the base station 108.

The wireless communications links 106 formed between the markers 102 in each connected pair can be formed by the markers acting as nodes in an ad hoc communications network. The markers 102 can therefore also be referred to as "nodes".

The site 104 can include moving ground 122 which includes moving markers 124 of the markers 102, and stable ground 118, which includes anchor markers 120 of the markers 102. The anchor markers 120 do not substantially move during a ground movement in the site 104, whereas the moving markers 124 do move. In a situation where the moving ground 122 of the site 104 moves, e.g. during blasting in a mining application, the monitoring system 100 can be used to determine the locations of the moving markers 124 in a monitoring process 300. The monitoring system 100 can use the previously selected or determined locations of the anchor markers 120. For example, in mining, the anchor markers 120 may be located in the stable ground 118 at least partly distant from the blasting regions, while the moving markers 124 are located in the moving ground 122, e.g., which forms a muck pile. In a mining site, the moving markers 124 can be located in positions that relate to selected geological positions, such as boundaries between ore and gangue. During blasting, the ore boundaries can move, and the moving markers 124 can move with the boundaries. The monitoring system 100 can determine the locations of the moving markers 124 after blasting, and thus determine the new boundaries of the ore bodies. The new locations of the ore boundaries in the muck pile can be used during digging and separation of the blasted material to separate the economically valuable rock (including the ore) from the non-economic rock, which is therefore not processed to extract the ore, thus reducing "ore dilution". The monitoring system 100 can be used in open-pit mining operations, such as gold mining operations, where there is a substantial difference between the economic value of the ore and the surrounding rock, and where determination of the ore boundaries in the muck pile can be important for the economic viability of the mining operation.

The markers 102 are provided by devices in the ground, which are described in more detail hereinafter; thus in at least some respects the markers 102 can also be referred to as "devices". The devices can be robust and inexpensive to manufacture. The devices can be used in mining operations, such as blasting: the mining devices are configured to withstand mechanical impact and acceleration, and can be sufficiently cheap to be disposable after use. Alternatively, the devices can be wholly or partially reusable.

The monitoring system 100 can provide, through location of the markers 102, a form of three-dimensional (3D) geological map of selected locations (corresponding to the marker locations) in the ground, including to a depth that is not limited by only one of the wireless communication links 106 (by using the distant markers 114 buried deep in the ground). The monitoring system can generate the three-dimensional map of locations in a relatively short period of time (e.g., within 1-60 minutes, or within 1-12 hours), limited by the speed of communication between the markers 102, to the base station 108 and the processing speed of the computing machine 110. In a mining application, the locations of the markers 102 can be rapidly determined, to provide almost real-time information of the locations of ore boundaries in a recently blasted muck pile. Elements of the monitoring system (e.g., portions of the base station 108) do not need to be moved physically around the site 104 to collect information about the locations of the markers 102, thus increasing the speed and safety of the system 100 compared to prior art systems which may require movement of monitoring equipment relative to the muck pile (e.g., carried by a human operator). The three-dimensional location data can be used in mining plant equipment, such as diggers, which can receive the location information and use consequently updated three-dimensional geological maps of the muck pile with the new ore boundaries during excavation.

The links 106 can be used to determine properties of the ground between each pair of the markers 102, specifically along the regions defined by the wireless communication links 106. For example, for link 106 using radio-frequency (RF) electromagnetic signals, the relevant properties of the ground are the attenuation, dispersion and delay, which are related to the conductivity and permittivity between two wirelessly connected, markers in a volume or region defined by the propagation paths of the RF signals.

The markers 102 can provide sensor information beyond that required to determine the locations, including sensor information relating to the local properties of the ground at the location of each of the markers 102, e.g., the pressure, the temperature, geo-location coordinates, the pH, etc., gathered by sensors associated with each of the markers 102

(e.g., in the marker devices, as described hereinafter). This sensor information is communicated using the wireless communication links 106 over the ad hoc network to the base station 108, and can be processed by the computing machine 110.

Device 100A

Figure 1A:
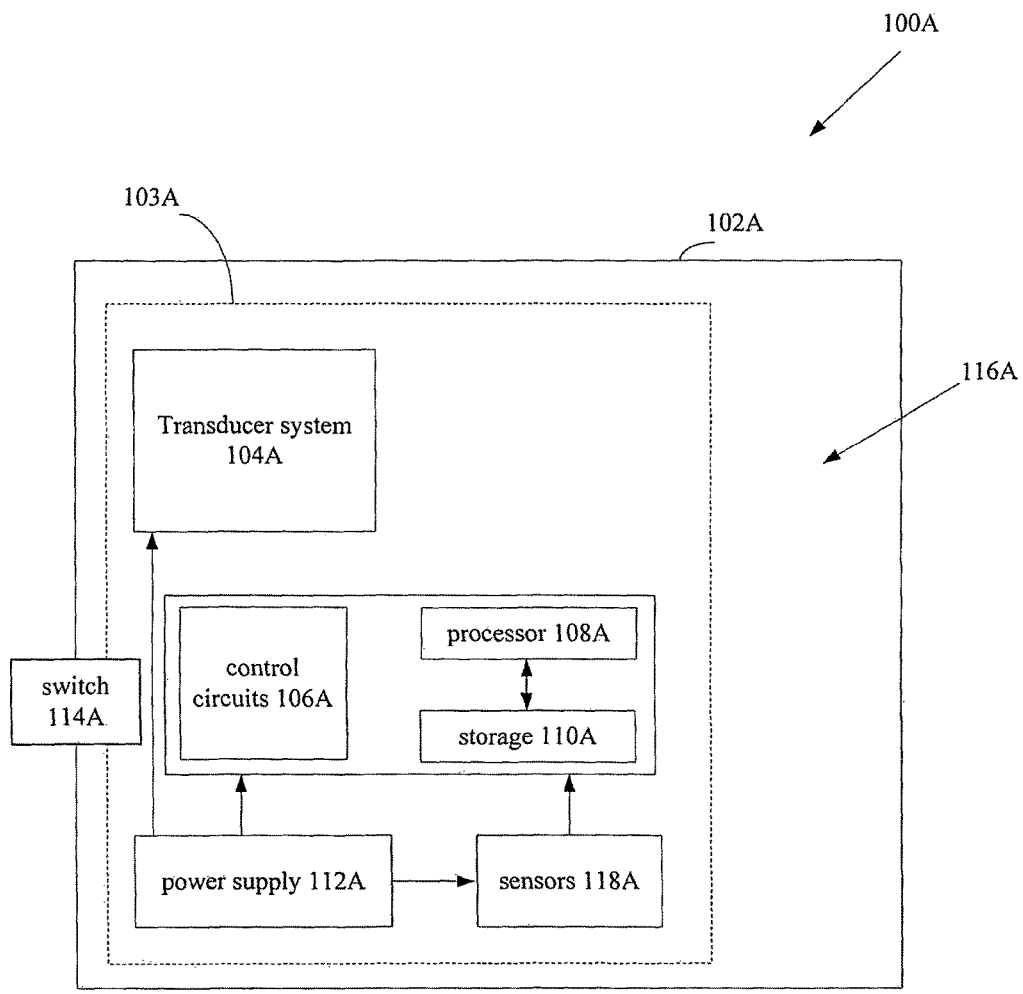
FIG. 1A is a block diagram of a device in the monitoring system.

The markers 102 are provided by devices that can connect wirelessly with one another using in-ground signalling. Each marker 102 can be provided by a device 100A with a protective casing 102A that surrounds and protects its electrical/electronic components 103A, as shown in FIG. 1A.

The electronic components 103A of the marker include a transducer system 104A which emits and receives the transmitted signals to and from others of the markers 102. The transducer system 104A can include any one or more of the following transducers:

(1) antennas for emitting and receiving electromagnetic signals, e.g., radio-frequency (RF) frequency signals;
(2) electrical loops for emitting and receiving magnetic induction (MI) signals; and
(3) electro-mechanical transducers for generating and receiving mechanical signals.

The antennas can include folded monopole antennas, micro-strip antennas, and/or T-fed loop antennas. The transducers can include piezo-electric transducers.

The radiation patterns of the markers 102 can be selected to be substantially isotropic or omni-directional to reduce transmission changes due to orientation changes of the markers 102. Alternatively, the radiation patterns may be compensated for when determining distances from the transmitted signals. For example, if the antennas are linearly polarized antennas, physical misalignment results in antenna pattern loss or polarization mismatch loss giving a reduction in the observed signal strength. This can be compensated in the monitoring process 300 by subtracting the antenna pattern loss from the signal strength measurements. For example, for two vertically polarised antennas separated by r meters and misaligned by an angle θ, using a short dipole antenna pattern, the total loss due to the pattern effect $P_M$ can be determined (in dB) using the following relationship:

$$P_M = 10 \log(\cos^2 \theta) = 20 \log(\cos \theta).$$

The device 100A includes control circuits 106A, connected to the transducer system 104A, which control the transducer system 104A to emit (i.e., send) the transmitted signals, and which receive signals from the transducer system 104A representing the received signals of the transmitted signals. The control circuits 106A include a processor 108A for controlling the control circuit 106A and for receiving, interpreting, processing and storing data representing at least portions of the received signals. The processor 108A stores the data in data storage 110A (e.g., a computer memory chip) in the control circuits 106A. The processor 108A accesses stored data in the storage 110A to generate data that is sent/represented by the emitted signals. The processor 108A can use a commercially available operating system to execute commands generated from the "C" programming language (e.g., compiled as machine code).

The transducer system 104A and the control circuits 106A are connected to a power supply 112A which supplies electrical power to the others of the electronic components 103A of the device 100A. The power supply 112A can include one or more batteries, energy harvesting devices (e.g., based on thermal or vibrational transducers), and/or capacitors (e.g., charged before placement in the ground, and/or charged by energy harvested from ground vibrations, such as due to a blast). The device 100A can include a switch 114A which can be activated through the protective casing 102A by a person wishing to turn the device 100A on or off manually. The storage 110A includes data representing a power-off, or "sleep" mode, which can be accessed by the processor 108A to control the device 100A to enter a sleep mode by reducing electrical power consumption of the electronic components 103A of the device 100A, for example the transmitter can be powered down (signal transmission can be the biggest power consumer in these devices). Sleep mode means that the device 100A only looks for a signal every few milliseconds rather than continuously: it does not turn off completely. The process 108A can be configured to end sleep mode when the device 100A receives a wireless transmitted signal to the transducer system 104A indicating that the device 100A is to exit the sleep mode. This signal is referred to as an "activation signal". This signal is sent from the base station 108 and wakes up the close markers 116, which then wake up the distant markers 114, and the activated markers then start listening for their own neighbouring markers etc. At least some of the electronic components 103A can be held and connected using one or more printed circuit boards (PCBs) with electronic components mounted thereon.

The device 100A includes a filling apparatus 116A to hold the electronic components 103A of the device 100A in the protective casing 102A. The filling apparatus 116A can include a printed circuit board, configured to hold the electronic components 103A, which is fastened by screws or bolts to the protective casing 102A. The filling apparatus 116A can also include an electrically non-conductive (insulating) material that fills any air pockets in the protective casing 102A to generally surround and mechanically support the electronic components, e.g., including a plastic, a resin, an epoxy and/or polyurethane. The boards may be overmoulded with a thermoplastic, or just enclosed in a case which subsequently can be filled with polyurethane foam or similar.

The device 100A can include one or more sensors 118A, which are configured to sense environment properties of the device 100A and thus the ground around the device 100A.

The sensors 118A can include one or more of the following sensors:

(1) temperature sensors for measuring a temperature of the device 100A, and/or an environmental temperature of the ground immediately surrounding and/or in contact with the protective casing 102A;
(2) pressure sensors for detecting a pressure of the ground surrounding the device 100A in one or more dimensions;
(3) accelerometers for detecting accelerations in one, two or three orthogonal linear directions, and/or gyroscopes for detecting rotational accelerations in one, two or three orthogonal rotational directions, of the device 100A;
(4) geo-location sensors for receiving location signals (e.g., from GPS satellites, or a site-specific positioning system) and generating data representing geo-location coordinates of the location of the device 100A; and
(5) pH sensors configured to detect acidity and/or basicity (alkalinity) levels of the ground surrounding and/or in contact with the device 100A.

The sensors 118A generate sensor signals under the control of the control circuits 106A, and the sensor signals are detected by the control circuit 106A and processed by the processor 108A. The processor 108A stores sensor data in the storage 110A representing the sensor signals, and can send the sensor information in the emitted signals from the device 100A representing the sensor signals.

Data Architecture 200

Figure 2:
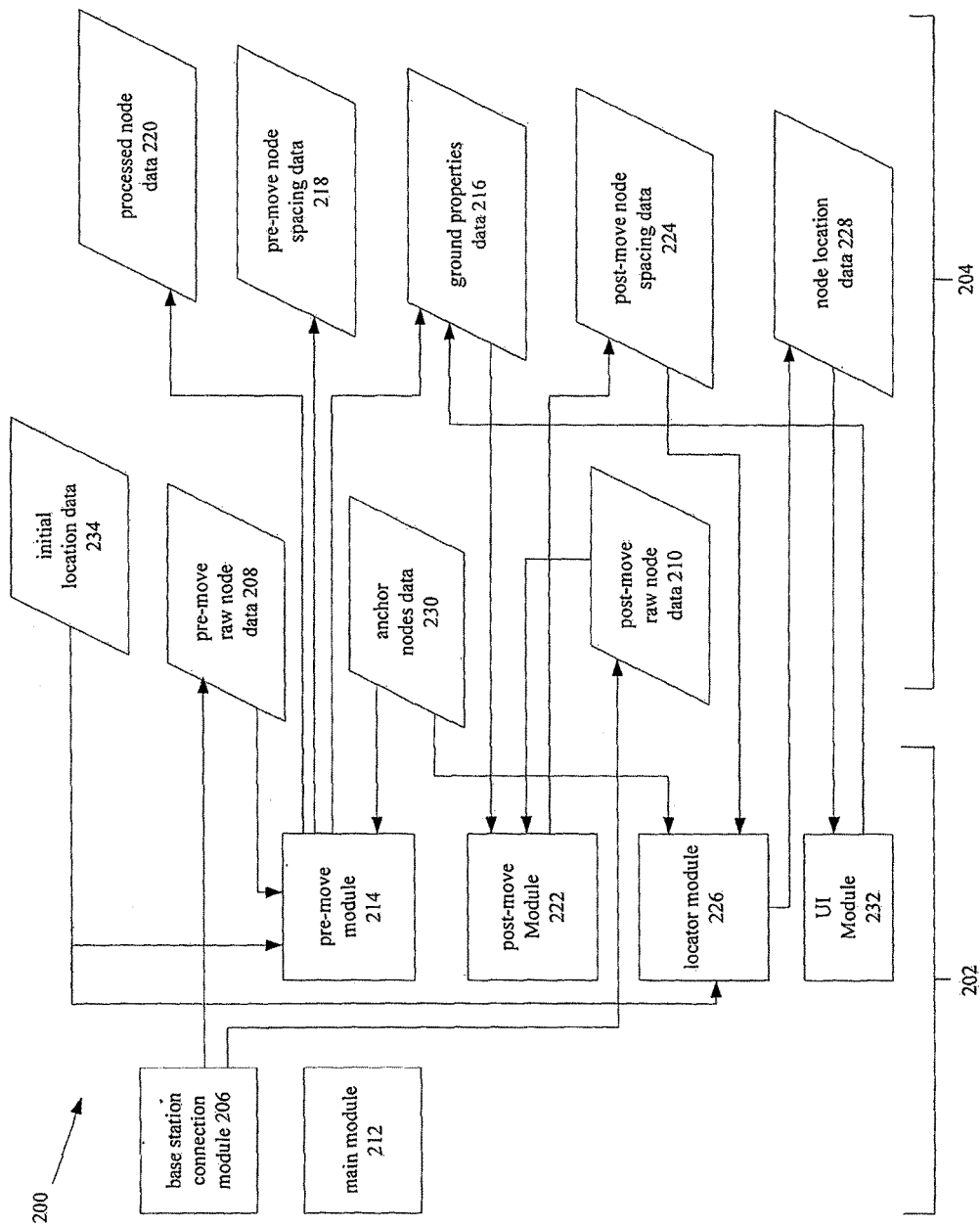
FIG. 2 is a block diagram of a data architecture of the monitoring system, including monitoring modules and data structures.

The computing machine 110 includes a plurality of monitoring modules 202 and data structures 204 arranged in a data architecture 200, as shown in FIG. 2. The monitoring modules 202 are stored in computer-readable storage of the computing machine 110, and executed by one or more computing processors of the computing machine 110. The data structures 204 are generated and accessed by the monitoring modules 202 in the computer-readable storage of the computing machine 110. The monitoring modules 202 can be implemented as Matlab modules using the Matlab package from the Mathworks Inc. The Matlab modules are executed by an operating system of the computing machine 110, e.g., Microsoft Corporation's "Windows" operating system.

The monitoring modules 202 include a base station connection module 206, which is configured to communicate with the base station 108 using the data link 112. For example, the base station connection module 206 accesses Universal Serial Bus (USB) drivers (in the operating system of the computing machine 110) and receives data from the base station 108 representing data received from the markers 102 by the base station 108. The base station connection module 206 stores this data in the computing machine 110 as raw node data. The raw node data represents the transmitted signals transmitted between the markers 102 in the monitoring system 100. The raw data is referred to as "node" data because represents signals generated by the nodes in the network of markers. Movement of the markers 102, e.g., during blasting in a mining process, occurs while the monitoring system 100 is performing the monitoring process. In these situations, the raw node data include pre-move raw node data 208 (also referred to as pre-movement data) and post-move raw node data 210 (also referred to as post-movement data). The pre-move raw node data 208 represent transmitted signals from the markers 102 before they move, and the post-move raw node data 210 represent transmitted signals from the same markers 102 which have moved to new locations in the site 104. The pre-move raw node data 208 can be used to determine properties of the site 104, such as values of selected ground properties (e.g., ground conductivity etc.), and the post-move raw node data 210 can be used to determine new locations of the markers 102 after they have moved.

The data structures 204 include initial location data 234, which represent the initial locations of the markers 102, e.g., before movement occurs. The initial location data 234 is generated based on information about the placement of the markers 102 in the site 104.

The monitoring modules 202 include a pre-move module 214. The pre-move module 214 accesses the initial location data 234 and generates pre-move node spacing data 218 which represents the distances between the markers 102 (i.e., the initial spacings of the markers).

The pre-move module 214 accesses the pre-move raw node data 208 and generates ground properties data 216. The ground properties data 216 represent properties of the ground of the site 104 in which the markers 102 are located/placed. The ground properties data 216 represent properties of the ground between the markers 102 where the transmitted signals have travelled, i.e., along the wireless communications links 106. The ground properties data 216 can represent values associated with any one or more of the following ground properties:

(1) electro-magnetic ground properties, such as signal attenuation, signal delay, dispersion, impedance, ground conductivity and/or ground permittivity, when the transmitted signals include electro-magnetic signals;

(2) magnetic ground properties, such as signal attenuation, signal delay, dispersion, impedance, and/or permeability, when the electro-magnetic signals include magnet induction (MI) signals; and (3) mechanical ground properties, such as acoustic signal attenuation, signal delay, dispersion, and/or acoustic impedance.

The pre-move module 214 uses the anchor nodes data to determine the ground properties values before the movement occurs.

The monitoring modules 202 include a post-move module 222 which accesses the post-move raw node data 210 and the ground properties data 216 to generate post-move node spacing data 224 representing the spacing of the markers 102 after the movement has taken place. In examples, the movement is provided an explosive blast in the site 104, and the post-move node spacing data 224 represents the post-blast locations of the markers 102. The distances correspond to the distances travelled by the transmission signals along the communications links 106 and relate to the types of the transmitted signals (e.g., frequencies and means of propagation, and the corresponding ground properties of the ground between the markers). The distances can be at least indicative of the actual physical distances because the transmission signals travel along generally straight paths through the ground, e.g., as wavefronts generated by each emitting marker.

The monitoring modules 202 include a locator module 226 which is generally controlled by the post-move module 222. The locator module 226 accesses the post-move node spacing data 224 and generates node location data 228 representing the locations of the markers 102 after the movement. The locator module 226 accesses anchor nodes data 230 representing the anchor markers 120. The anchor nodes data 230 thus generally represent markers that have not moved substantially during the movement, and thus can provide reference data for the locator module 226. The anchor nodes data 230 may simply be a list of anchor identifiers indicating which of the markers 102 are the anchor markers 120.

The locator module 226 can also generate the node location data 228 using the pre-move node spacing data 218, in which case the node location data 228 will represent the pre-movement locations of the markers 102.

If no movement occurs, the post-move module 222 can still generate marker spacing data (as the so-called post-move node spacing data 224) based on transmission signals (using the raw node data as the so-called post-move raw node data 210) and ground properties values (the ground properties data 216); and the locator module 226 can still generate the locations of the markers 102 based on the spacings represented by the marker spacing data.

The monitoring modules 202 include a user interface (UI) module 232 which provides a user interface—including a graphical user interface (GUI)—for the operator of the computing machine 110. The user interface receives input signals from the operator to control the computing machine 110, and generates output data for display to the operator.

The UI module 232 allows the operator to view and amend the ground properties values by reading and writing the ground properties data: the operator may wish to correct or adjust the ground properties values, and/or to select ground properties values (e.g., based on previous experiments using transmitted signals in the ground of the site 104) manually. The operator may select the ground properties values based on their knowledge of the geology, e.g., that underground water running through the pre-blast area would have biased the post-blast data.

The UI module 232 accesses the node location data 228 to display multi-dimensional maps and graphs of the locations of the markers 102 determined by the locator module 226. The UI module 232 can access and/or receive geological map data representing a predetermined geological map of the site 104, and combine the geological map data with the node location data 228 to display the locations of the markers 102 in a three-dimensional geological map of the site 104. For example, many mines already have three-dimensional (3D) maps showing the geology of the mines: using the node location data 228 allows mine operators to see what sort of movements have occurred in different parts of the mine site, and to potentially adjust blasting practices accordingly.

The pre-move module 214 (or in some cases the post-move module 222) generates processed node data 220 (also referred to as sensor data) which represents the sensor signals from the markers 102. The sensor data can be used for confirming the ground properties values (e.g., the conductivities measurements etc.).

The monitoring modules 202 include a main module 212 which controls the other modules in the monitoring modules 202. The main module 212 can generate data for other computing devices and interfaces which use the location information generated by the monitoring system 100, for example: for interfaces on vehicles which drive around the site 102 and use or display the locations of the markers 102; or for using the processed node data 220 representing the sensor measurement signals.

Monitoring Process 300

The monitoring system 100 performs the monitoring process 300, which includes the markers 102 transmitting signals through the ground of the site 104, and then determining the locations of the markers 102 based on the transmitted signals.

Figure 3:
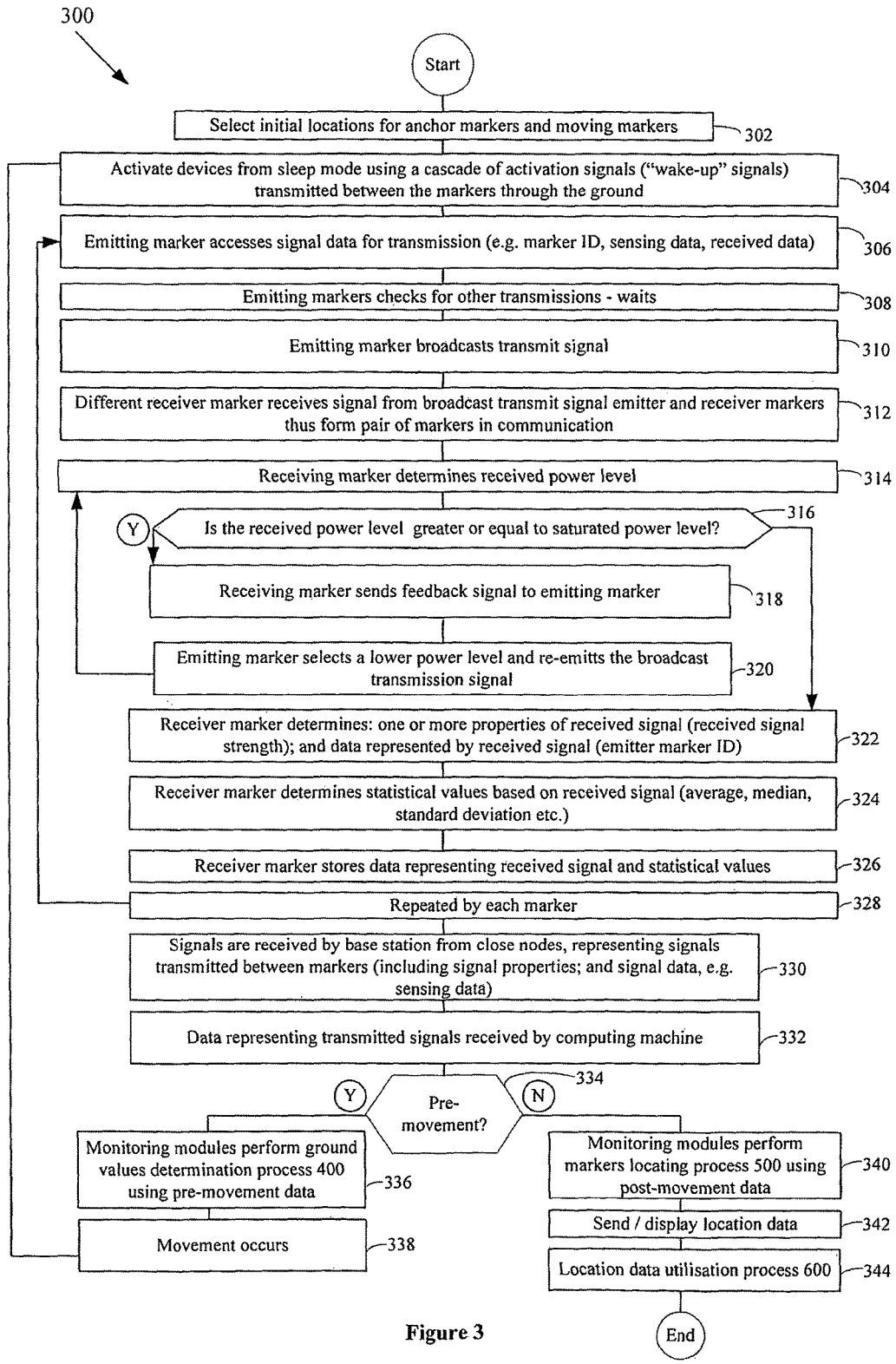
FIG. 3 is a flow chart of a monitoring process performed by the monitoring system.

The monitoring process 300 commences selection of initial locations for the markers 102, including the anchor markers 120 and the moving markers 124 (step 302), as shown in FIG. 3. The initial locations of the markers 102 can be selected based on the properties of the site 104. For example, for a mining site, the markers 102 can be placed in locations that have selected relationships to boundaries of interest in the site 104, including boundaries of ore deposits in the ground. In a mining operation, blast holes are drilled into the ground for the placement of explosives at selected locations across the mining site at explosive locations selected by mining engineers and geologists to blast the rock and ore into a muck pile for excavation. The markers 102 are placed in holes made between the blast holes, to avoid unnecessary damage to the markers 102 during blasting. The markers 102 are placed in the holes in the ground, and then the holes are usually filled with ground material, e.g., broken rock above the markers 102 (this is referred to as "stemming"). One or more ore boundaries are determined by geologists who create a geological map of the ore locations in the mining site.

In a mining blasting application, the anchor markers 120 are initially located away from the blast site, for example on the bench floor below. For example, the anchor markers 120 can be buried just under the surface of a selected area of the bench floor, so they do not move substantially during the blast. Then, when the muck pile covers the selected area of the bench floor, there is a high chance that one of the markers 102 will fall on top of, or adjacent to, the area of influence of the anchor markers 120 under the bench floor. In addition, there will generally be through-rock communication links 106 between the anchor markers 120 under the bench floor and the moving markers 124 in the muck pile on the bench floor, whereas markers in the ground nodes to the side of the blast may be in a wall after the blast, and there may be an air gap between this wall and the markers in the muck pile. Placing anchor markers 120 in the bench floor can be cheaper for the mine as there is no need to drill multiple holes for these anchor nodes 120. The anchor markers can also be placed outside the boundaries of the blast at multiple depth levels to provide more links 106 to markers 124 in the muck pile.

The anchor markers 120 remain generally in a fixed position during blasting, and can be used to calibrate measurements generated in the monitoring process 300, and to provide connections between the base station 108 and one or more of the moving markers 124 after blasting.

When the markers 102 have been positioned in the site 104, the each marker device 100A is activated from its sleep mode using a cascade (or "waterfall") of activation signals (also referred to as "wake up" signals) transmitted between the markers 102 through the ground (step 304). The activation signals are initially generated by the base station 108 under control of the computing machine 110. The base station 108 generates and emits or broadcasts an activation signal to the markers 102. The activation signal from the base station 108 is received by the close markers 116, e.g., marker A and marker C, as shown in FIG. 1 (although generally the close markers 116 will also be the anchor markers 120). Each close marker 116 then generates and emits a consequent activation signal based on the received activation signal. The consequent activation signals from the close markers 116 are received by the relatively distant markers 114, e.g., markers B, D, F and G. Each of these distant markers 114, on receiving the consequent activation signal, continues the cascade of activation signals by re-emitting the signals to other markers, thus acting as communicating nodes in a multi-hop ad hoc network formed of the markers 102 in communication distance. Each marker can receive activation signals from a plurality of other markers, and emit an activation signals to a plurality of markers, until all markers that are connected by the wireless links 106 have been activated. The markers 102 can continue to emit periodic activation signals: this can allow an out-of-range marker to appear on the network if it moves close enough to the other markers due to movement in the ground e.g., after the blast.

The network is referred to as a "multi-hop network" because the distant markers 114 can only communicate the base station 108 via others of the markers 102 (e.g., the close markers 116), and each link 106 is referred to as a "hop". Signals from the base station 108 are initially received by the close markers 116 over a first wireless link as a first hop; the close markers 116 emit further signals based on the received signals to the distant markers 114 along a second wireless link as a second hop, etc., and vice versa.

The network formed by the communication of the markers 102 is referred to as an "ad hoc" network because the wireless communications links 106 are formed based on initial broadcast signals from each of the markers 102, rather than connections being preselected between the markers 102, and each marker device 100A can act as a receiver and emitter node between any two other marker devices 100A of the markers. The communication paths between nodes in the network are thus determined based on the links 106 being established between each pair of nodes, regardless of their initial configuration and/or relative placement. Furthermore, if a link is lost, the network can reform itself around the lost link.

Once the markers 102 have been activated, each emitting marker, for example marker E, accesses any signal data required for transmission as stored in the storage 110A of the marker E. As described above, the stored marker data can represent the marker identified (ID), sensing signals received from the sensors 118A, and received data received from other makers 102 via previously transmitted signals (step 306).

Before transmitting signals, the emitting marker checks for other signal transmissions in its immediate surroundings (step 308). Each marker checks for existing transmissions before transmitting its own signal to ensure its own emitted signal does not get jammed (e.g., drowned out or lost) because others of the markers 102 which are within wireless communications range are instead receiving the other transmissions. To check for existing transmissions, the marker device 100A receives any signals using the transducer system 104A, and, if the power of the received signals is above a selected limit, the processor 108A causes the device 100A to wait until the received signals by the transducer system 104A fall below the selected background transmission levels. For example, in mining applications, three different power levels can be used.

When the emitting marker has determined that no other transmissions will jam its own signal, it broadcasts a transmission signal representing the signal data (step 310). The signal data is transmitted as at least one packet of digital information, e.g., formatted such that each byte of the transmitted signal is allocated to hold specific information. The broadcast signal from the emitting marker is received by a different marker, referred to as a receiving marker, of the markers 102 (step 312). The receiving marker and the emitting marker thus form a pair of markers in connected via one of the wireless communication links 106. For example, marker E can be the emitting marker, and marker D can be the receiving marker connected by a wireless communication link 106, as shown in FIG. 1. Marker E thus sends to marker D its signal information, including marker E's identifier, using the transmitted signal.

The receiving marker, on receiving the transmitted signal, generates a received signal and determines the power level of the received signal (step 314). The receiving marker can determine the received power level based on the power received by the transducer system 104A during reception of the transmitted signal. For example, the received power level can be the averaged received signal power measured over the duration of the at least one packet in the transmission signal.

The receiving marker determines whether the received power level is greater then or equal to a saturated power level of the receiving marker (step 316). The saturated power level of each device 100A is the maximum power of a transmitted signal that it can receive in the transducer system 104A without saturating, or entering a non-linear response region. For example, the transducer system 104A can contain analogue electronic operational amplifier circuits which saturate at signal levels corresponding to received signal power at or above the saturated power level. In an example marker device, the maximum power may be about −53 dBm (and the minimum power may be about −100 dBm).

If the received power level is greater than or equal to the saturated power level, as determined in step 316, the receiving marker generates a feedback signal for transmission to the emitting marker for indicating to the emitting marker that the power level has saturated (step 318). The emitting marker only communicates with one receiving marker at a time, and thus does not receive feedback from more than one marker at the same time. For example, for each device 100A, when the processor 108A determines that the received power level is equal or above the saturated power level, based on a saturated power level represented in the stored marker data (in the storage 110A), the processor 108A controls the transducer system 104A to emit a feedback signal, including the marker identifier of the emitting marker, and the marker identifier of the receiving marker, and an indication that the received power level is equal to or above the saturated power level. On receiving the feedback signal, the emitting marker selects a lower power level and re-emits the broadcast transmission signal (step 320). The receiving marker then re-receives the re-emitted broadcast transmission signal, and determines the power level again, in step 314. In an example marker device, the power is reduced in 3-dB or 10-dB steps, or between three different levels.

When the receiving marker has received the transmission signal with a received signal strength below the saturated level, as determined in step 316, the receiving marker determines:

(1) analogue signal properties of the received signal itself, e.g., the signal strength which is related to the received power level, or the arrival time of the transmitted signal, pulse shapes of one or more pulses in the transmitted signal, etc.; and (2) digital data represented by the received signal that represents, e.g., the identifier of the emitting device, the sensing data from the emitting marker, stored data received by the emitting marker, etc. (step 322).

Figure 4:
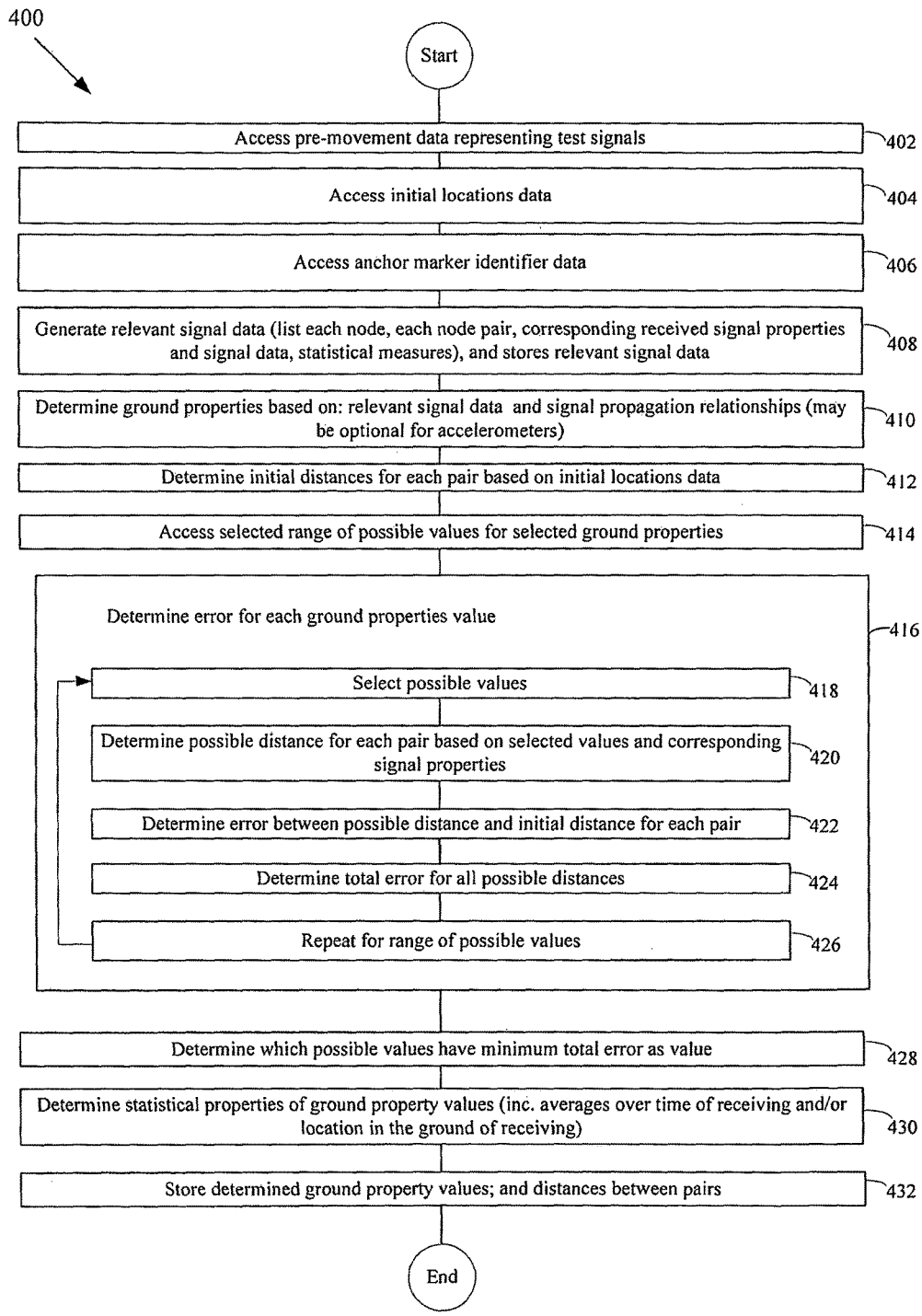
FIG. 4 is a flow chart of a ground values determination process of the monitoring process.
Figure 5:
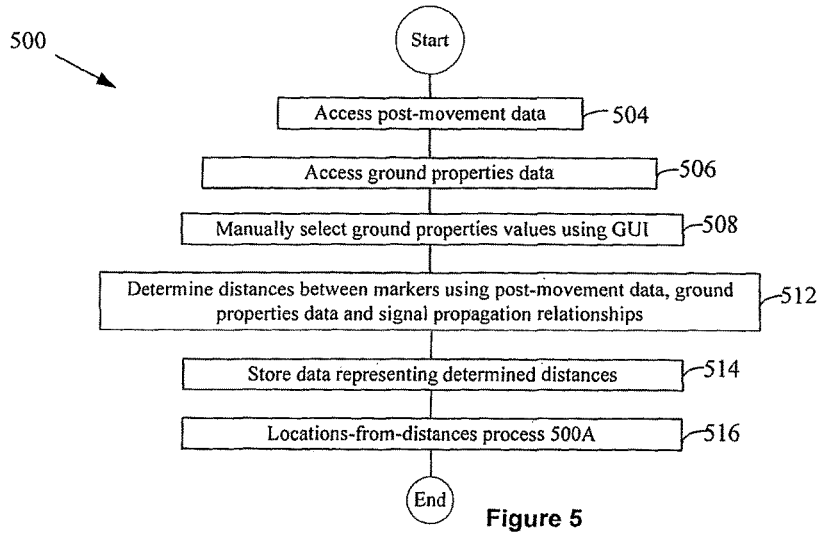
FIG. 5 is a flow chart of a marker locating process of the monitoring process.
Figure 5A:
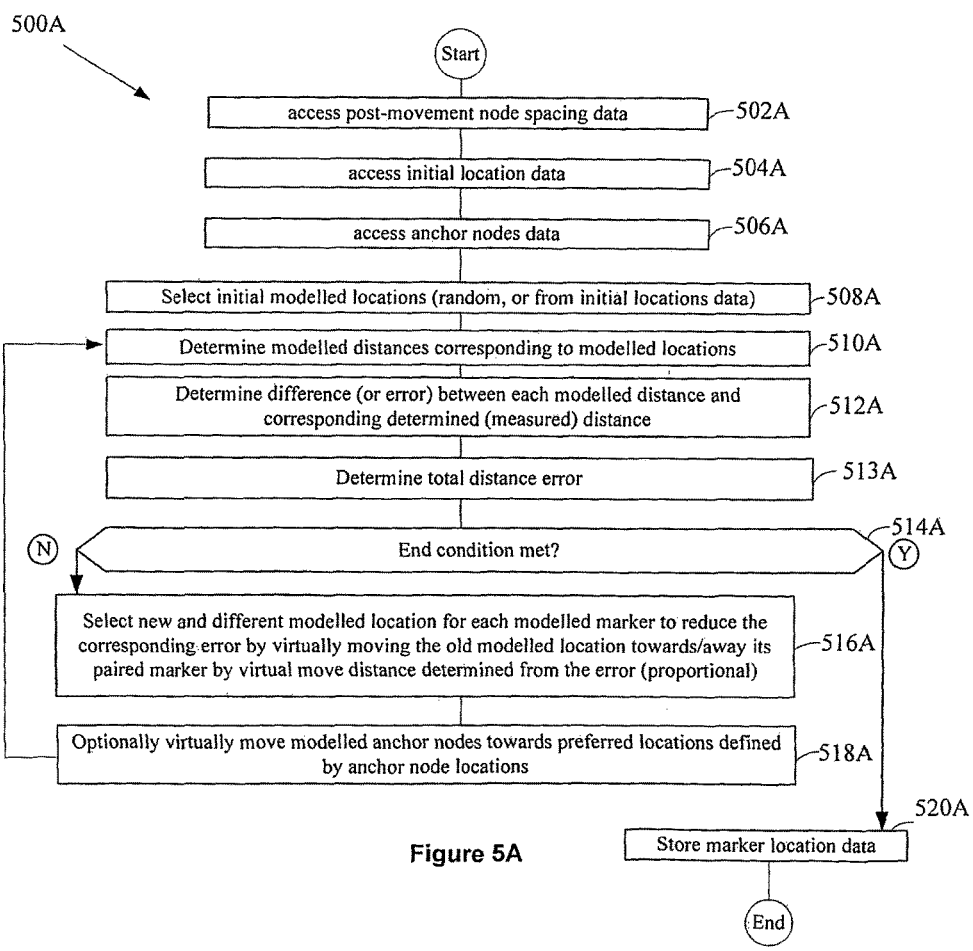
FIG. 5A is a flow chart of a locations-from-distances process of the marker locating process.
Figure 6:
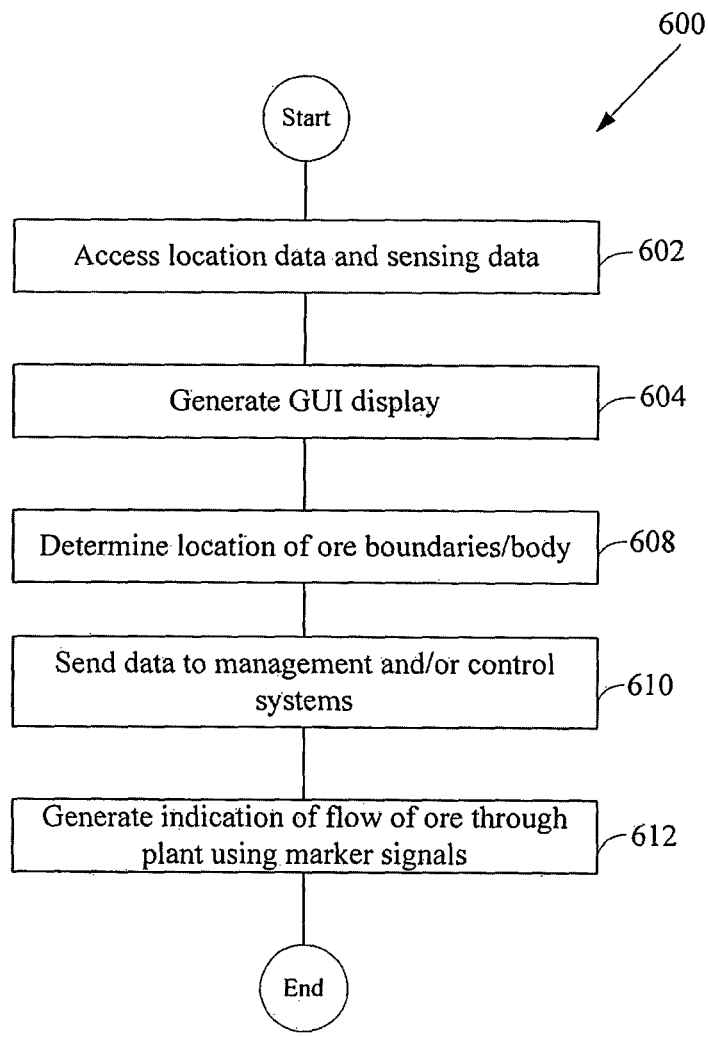
FIG. 6 is a flow chart of a location data utilisation process of the monitoring process.

The receiving marker stores data representing a plurality of the most recently received signals. An example device can store data representing the analogue signal properties of the most recent 200 signals. This collection of individual signals is indicative of signal-to-signal variation, and can be used to determine statistical properties of the received signals, such as the mean, the median, the standard distribution, the variance, the maximum, the minimum, etc., when data representing the collection is processed by the computing machine 110. These statistical properties can be used by an operator to determine the quality of the transmitted signals, e.g., how noisy and how reliable they may be. Use of the statistical values can reduce the amount of data that needs to be stored and transmitted between the markers. The operator typically selects the median value to use in future calculations, with reference to the steps in FIGS. 3-5.

The receiving marker determines statistical values of a plurality of received signals based on the received signal (step 324). The statistical values are used by each receiving marker when it receives a plurality of transmission signals from the same emitting marker: for example, the marker E (the emitting marker) may transmit a plurality of transmission signals (each representing marker E's identifier) to the marker D, thus marker D (the receiving marker) can determine statistical values relating to any varying quantity in the received signal. The statistical values can include averages, medians, standard deviations, and variances of the analogue received signal properties, such as the received signal strength.

An example marker device determines the following statistical values:

(1) an average (or "mean") signal strength, based on the average signal power of the transmissions from each identified emitting marker (e.g., for each emitting marker, summing the signal strengths of each received signal and dividing by the number of received signals); and (2) a median signal strength, based on the most common signal power of the transmissions from each identified emitting marker (e.g., for each emitting marker, recording the signal strength of each received signal as falling within a selected range, or "bin", of values, and selecting the centre value of the most commonly selected bin as the median value).

An example processor in the device 100A can generate data representing a rolling average and/or a rolling median of the received signal strengths, stored in association with an identifier (a marker ID) of the emitting marker.

The receiving marker stores data in its data storage 110A representing the received signal and the determined statistical values (326). By storing the statistical values, rather than every single received signal, the receiving marker can represent variations in received signals more efficiently in its storage 110A, which can be limited in its capacity, particularly for markers 102 formed using small/disposable devices.

As described hereinbefore, each receiving marker is also an emitting marker: each of the markers 102 both receives and emits signals using the links 106. In the monitoring process, the receiving marker therefore becomes the next emitting marker, and communicates with a subsequent marker by repeating the steps 306, 308, 310, 312, 314, 316, 318, 320, 322, 324 and 326 (step 328).

When the closer markers 116 operate as emitting markers, the transmitted signals are received by the base station 108 (step 330). The signals received by the base station 108 represent at least in part all signals transmitted between the markers 102 in the site 104. The base station 108 thus gathers information from each marker 110A in the entire network. For example, marker E which is a distant marker 114, sends a transmission signal to marker D, which subsequently sends a further transmission signal representing the signal properties and signal data of the first transmission signal to marker C. Marker C then transmits a signal representing the signals it has received to the base station 108. The base station 108 can receive signals representing other signals properties and data via multiple links: for example, marker D transmits information to the base station 108 via marker C, and via marker F, which is connected by wireless communication links 106 to bother marker D and marker C, as shown in FIG. 1. The only markers not in communication with the base station 108 are those out of range of the base station 108 and out of range of others of the markers 102 (the out-of-range markers are not included in the markers 102 in FIG. 1).

The computing machine 110 receives data representing the transmitted signals received by the base station 108 as the raw node data (step 332).

The computing machine 110 determines whether the markers 102 are in a pre-movement or in a post-movement arrangement (step 334). The computing machine 110 can make this determination based on information received through the user interface (UI) module 232 from the operator. For example, the operator can select a control on the user interface to firstly download data from the base station 108, and to indicate that the received data is pre-movement data.

If the data from the base station 108 is pre-movement data, as determined in step 334, the monitoring modules 202 store the data received from the base station 108 as the pre-move raw node data 208, and perform a ground values determination process 400 using the pre-move raw node data 208 (step 336).

Once the ground values have been determined in the ground values determination process 400, the movement occurs in the site 104 (step 338). For example, in a mining site, the operator can activate a blasting sequence which moves the moving ground 122 and the moving markers 124.

The monitoring system 100 then repeats the portion of the monitoring process 300 from step 304 in which the markers 102 are activated using a cascade of activation signals. The markers 102 can be put into sleep mode before the movement/blasting occurs to save battery power.

If the data received from the base station 108 is post-movement data, i.e., not pre-movement data, as determined in step 334, the monitoring modules 202, and specifically the base station connection module 206, store the data received from the base station 108 as the post-move raw node data 210, and perform a device locating process 500 to determine the post-movement locations of the markers 102 (step 340).

Using the data representing the locations of the markers 102, the monitoring modules 202 display location information representing the locations of the markers 102, using the UI module 232, and send data representing the determined location information to other devices of the monitoring system 100 (step 342). The other devices of the monitoring system can include other computing devices (e.g., including blasting or other software used to modify the next blast pattern and to give better control) used by users viewing the locations of the markers 102 and planning future blasts, or automated systems in plant apparatus or equipment, such as digging machines, which use the location data in a location data utilisation process 600 (step 344).

Ground Values Determination Process 400

In the ground values determination process 400 the monitoring system 100 determines the values of the selected ground properties (referred to as the ground property values or the ground values). As described hereinbefore, the ground properties can include the electro-magnetic and mechanical ground properties (such as signal attenuation, delay, dispersion, impedance, conductivity, permittivity, magnetic permeability, acoustic impedance and/or ground density). The determined ground values are used to characterise the properties of the ground in the subsequent device locating process 500. In the ground values determination process 400, the pre-move module 214 accesses the pre-move raw node data 208 representing the pre-movement transmission signals, which are also referred to as test signals (step 402). The pre-move module 214 accesses the initial locations data 234 representing the selected initial locations of the markers 102 (step 404), and accesses the anchor nodes data 230 identifying which of the markers 102 are the anchor markers 120 (step 406). The anchor markers 120 are identified using marker IDs of the anchor markers 120. Knowledge of the locations of the anchor markers 120 is used to confirm that a communications path (comprising the links 106) can exist between the anchor markers 120 and the moving markers 124.

The pre-move module 214 uses the pre-move raw node data 208 to generate relevant signal data (step 408), which represents one or more of the following:

(1) the marker identifiers of the markers 102;
(2) the pairs of markers that are or were connected by one of the links 106 (e.g., pairs of the marker identifiers);

(3) the analogue signal properties and the digital signal data of each transmitted signal;
(4) the statistical measures generated by each receiving marker in step 324 of the monitoring process 300; and
(5) the sensor measurement signals of the sensors 118A in each marker device 100A.

The pre-move module 214 stores the relevant signal data from step 408 in the processed node data 220.

The pre-move module 214 determines the ground values between markers in each connected pair of markers (step 410) based on:
(1) the distances between the two markers in the pair, represented by the initial locations data;
(2) the analogue signal properties of the transmitted signals between the two markers in the pair, represented by the relevant signal data; and
(3) one or more signal propagation relationships represented in stored data of the computing machine 110.

For example, the ground values related to signal attenuation can be determined from the received signal strengths of the received signals of each wireless link 106, and the distance travelled through the ground by the signals before they are received.

In an example, a signal propagation relationship for electro-magnetic transmission signals can be used to determine electromagnetic ground properties. For example, the complex electric field ($\tilde{E}$) received by the receiving marker is related to the complex electric field ($\tilde{E}_0$) emitted by the emitting marker based on the distance (r) between the two markers and the permeability ($\mu$) and electrical conductivity ($\sigma$) of the ground of the corresponding transmission link, according to the relationship in Equation 1:

$$\tilde{E}_r = \tilde{E}_0 \exp(-j\omega r\sqrt{\mu\epsilon(1+\sigma/j\omega\epsilon)})r \qquad (1),$$

where j is the square root of −1, "exp" is the exponential function and refers to the exponent ($e^x$) of Euler's number (e), $\omega$ is the angular frequency of the transmitted electromagnetic radiation, $\epsilon$ is the electrical permittivity, $\epsilon = \epsilon_r \epsilon_0$, $\epsilon_r$ is the relative permittivity of the medium, $\epsilon_0$ is the permittivity of free space, and $\mu$ is the permeability of the ground along the transmission link. The value used for permeability $\mu$ is about 1 when there are no substantial magnetic properties, which is the case for most ground and rock materials.

An alternative equation that can be used to compensate for signal losses caused by antenna pattern mismatches is the Friis transmission equation with an attenuation coefficient of $\alpha = \sqrt{\mu\sigma\omega/2}$.

The pre-move module 214 determines the pre-movement distances between the markers in each pair of connected/communicating markers based on the initial locations in the initial locations data (step 412). For example, the initial distances data can be generated by determining the differences, in three Cartesian dimensions, between the locations of the markers in each pair.

In embodiments, it may not be necessary to measure the actual conductivity, but instead "errors" or changes in the power of the transmitted signals can be used to determine respective changes in the distances between the markers 102 from the known pre-blast distances (optionally including an adjustment of the post-blast estimated distances due to changes in the conductivity etc. of the blasted ground, e.g., to compensate for aeration of the rock).

The pre-move module 214 accesses selected ranges of possible values for each ground value, selected by an operator (step 414). The selected range of possible values for each ground property is selected to limit the generated ground values to the most probable ground values, and/or to reduce the processing required to determine the ground property values. The ranges are selected based on previous experimental and/or theoretical data. In an example monitoring system 100, the selected ground properties are permittivity and electrical conductivity, and the respective ranges of possible values may be about $\sigma = 10^{-4}$ to 4 Siemens per meter (S/m) and $\epsilon_r = 3$ to 20.

The ground values may be selected manually by a user (i.e., based on their experience), or using an automated process.

The ground property values are determined from the possible ranges of values by determining an error (i.e., a difference) between the determined initial distances of the distances between the markers 102 and the modelled distances between the markers, which are generated in an iterative process using each of the possible values in each range (step 416). The ground properties values can be determined for each link 106, or average ground properties values can be determined that are the same for some or all of the links 106.

The iterative error determination process in step 416 uses the signal power transmitted across each of the links 106 together with a possible value of each ground property for that link to determine a possible distance: then the possible distance is compared to the determined initial distance, and if they are not the same, a so-called error is generated representing the difference between these distances. The process is repeated for each combination of the possible values in the selected ranges of the ground property values. The values of the ground properties corresponding to the smallest error are selected as the ground properties value. For the average ground properties values, the process is repeated for each combination of the possible values; to determine ground property values for individual links, or for groups of links, the iterative error determination process is repeated for each combination of possible values for each group or each individual link (which is a more time-consuming and computationally intensive process).

In the error determination process of step 416, the pre-move module 214 selects a possible value for each of the ground properties (step 418). For example, for an electromagnetic transmission signal, the ground properties may be permittivity and electrical conductivity, and the selected values start at the lowest values in each of the ranges (accessed in step 414).

The pre-move module 214 uses the selected possible ground properties values from step 418, and the received signal properties for each link 106 (e.g., the signal attenuation of each transmission link) in the pre-move raw node data 210, to determine a corresponding possible distance, e.g., using the relationships shown in Equation 1 (step 420). For each distance between the markers 102, represented by the initial locations data 234, the pre-move module 214 determines an error (or a difference) between each possible distance and each corresponding initial distance (step 422), and uses these differences to generate a total error for all possible distances for this particular iteration of the possible ground property values (step 424). For example, the total error can be based on a sum (or a root mean square, RMS) of the magnitudes of the differences between the possible distances and respective initial distances between the markers 102. The error determination process in step 416 is repeated for each combination of possible values in the selected ranges of ground parameter values (step 426).

The error determination processing step 416 can generate data representing a one-dimensional relationship between the total error and one ground property value, or a multi-dimensional relationship between the total error and two or more ground property values, (with the number of dimensions corresponding to the number of ground properties). For example, by repeating the error determination process over a range of possible conductivity values and over a range of possible permittivity values, the pre-move module generates data representing a two-dimensional surface with values of total error (the two-dimensional surface can be represented on a three-dimensional graph).

The ground property values which, in combination, correspond to a minimum total error value over the possible conductivity and permittivity values are selected as (or determined to be) the most probable ground property values, i.e., corresponding to the combination of ground property values lying in the respective selected ranges that most closely corresponds to the initial locations of the markers (step 428).

The pre-move raw node data 208 represent the statistical values of the transmitted signals determined in step 324 of the monitoring process 300. These statistical values are used to generate statistical properties of the determined ground property values (step 430). For example, a measure of statistical confidence in each ground property value can be generated based on the statistical confidence (e.g., expressed as the variance or the standard deviation) of the test signals represented in the pre-move raw node data 208.

The pre-move module 214 generates and stores the pre-move node spacing data 218 representing the determined initial distances from step 412, and the ground properties data 216 representing the determined ground properties values from step 428 (step 432).

In an example pre-move module 214, at least portions of the ground values determination process 400 are performed in accordance with instructions generated based on Matlab code, to determine the pre-blast ground properties values.

Marker Locating Process 500

Following the determination that movement has occurred in the site 104, as determined in step 334 of the monitoring process 300, the post-move module 222 generates the post-move node spacing data 224 (based on the post-move raw node data 210 and the ground properties data 216), and the locator module 226 generates the node location data 228, representing the locations of the post-movement nodes (based on the post-move node spacing data 224 and the anchor nodes data 230), in the device locating process 500.

In the device locating process 500, the post-move module 222 accesses the post-move raw node data 210 (also referred to as the post-movement data) (step 504), and accesses the determined ground properties data 216 (step 506).

Figure 7:
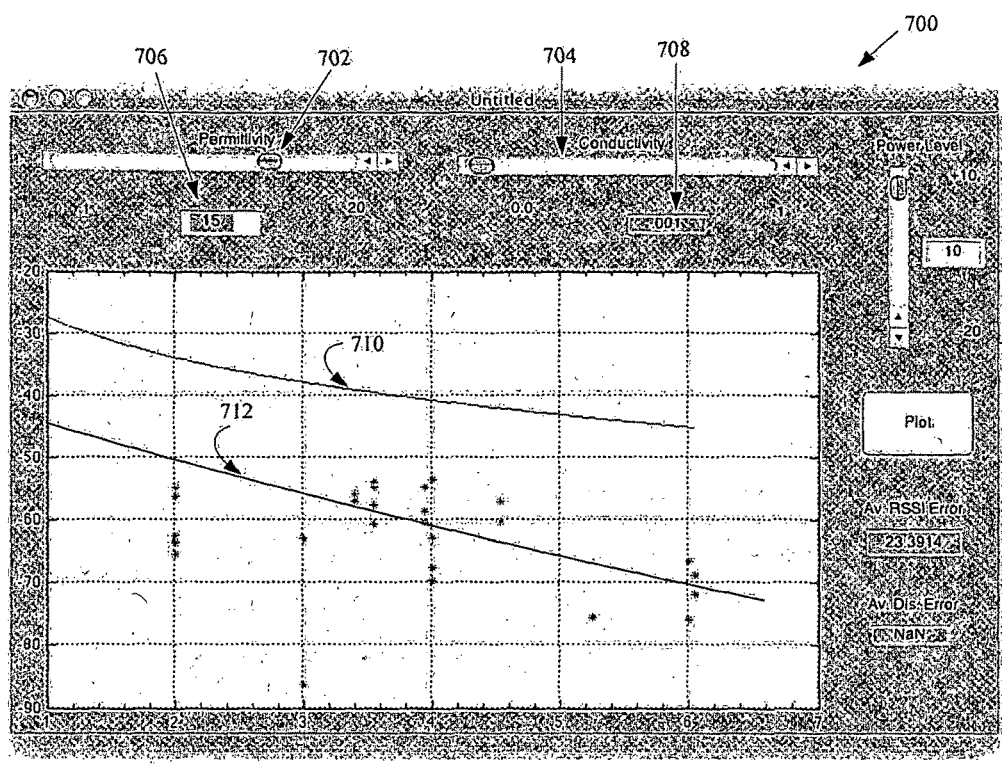
FIG. 7 a screenshot of a values selection interface of a user interface provided by the monitoring system, used for selecting ground properties values in the monitoring process.

The ground properties used in the device locating process 500 can be the determined ground properties values in the ground properties data 216 (from step 432 of the ground values determination process 400). Alternatively or additionally, the ground properties values can be based on user selections, received through the user interface (UI) module 232, that adjust and/or define the ground properties values: the UI module 232 generates a values selection interface 700, e.g., as shown in FIG. 7, and the post-move module 222 receives user-selected ground properties values from the UI module 232 via the values selection interface 700. The values selection interface 700 allows the operator to view a graphical representation of signal strength as a function of distance, e.g., as shown in the plot in FIG. 7 (with received signal strength on the vertical axis in dBm). The operator can decide whether to use the automatically generated ground properties values, or to adjust them, or to enter completely new values, based on their consistency: for example, the generated results need to fit within the confines of the muck pile holding the moving markers 124. The values selection interface 700 allows a user to adjust ground properties values, for example using graphical slide bars 702, 704, and numerical input controls 706, 708, e.g., for the permittivity and the conductivity as shown in FIG. 7. For example, automatically generated permittivity and conductivity values (represented by a theoretical line 710 in the values selection interface 700) may not correspond to the observed results (shown as stars or asterisks in the values selection interface 700), so an operator can manually change the average relative permittivity and conductivity values to generate a relationship, represented by line 712 in the interface 700, that more closely matches the measured signal strengths and distances for the pre-base links 106.

The post-move module 222 determines the distances between the post-movement nodes using the post-move raw node data 210, the selected and/or determined ground property values and signal propagation relationships, e.g., as shown in Equation 1 (step 512).

The post-move node spacing data 224, representing the determined post-movement distances between the markers 102, are stored by the post-move module 222 (step 514).

The marker locating process 500 includes the locations-from-distances determination process 500A in which the locator module 226 determines the marker locations corresponding to the determined post-movement distances (step 516).

In an example post-move module 222, at least portions of the marker locating process 500 are performed in accordance with instructions generated based on Matlab code.

Locations-from-Distances Process 500A

The locator module 226 generates the node location data 228 based on the post-move node spacing data 224 in the locations-from-distances process 500A. Process 500A may also be referred to as a "trilateration process". The process of determining locations of points in three dimensions based on known distances between the points can be referred to as "trilateration". The locations-from-distances process 500A may also be used to confirm the initial locations of the markers based on the pre-move node spacing data 218.

The locator module 226 accesses the post-move node spacing data 224 (step 502A), the pre-move node spacing data 218 and/or the initial location data 234 (step 504A), and the list of anchor marker identifiers represented by the anchor nodes data 230 (step 506A). The anchor marker identifiers are used to determine which of the markers represented in the initial location data 234 are anchor markers 120 and which are moving markers 124 (step 510).

The locator module 226 then determines the post-movement marker locations using an iterative process (in steps 508A, 510A, 512A, 514A, 516A and 518A):

(1) a model of the locations is selected (or virtually constructed) for modelling the locations of the markers;

(2) model distances (or modelled distances) between the model markers (or the modelled markers) in the model are compared to the respective measured (or determined) distances in the post-movement data;

(3) differences (referred to as "errors") between the model distances and the respective measured distances are determined;

(4) the model is modified based on the errors to reduce the difference between each model distance and corresponding measured distance; and (5) the iterative process is repeated until the model of the locations is sufficiently close (according to an end condition) to the measured locations of the markers 102.

The locator module 226 selects initial model locations, defined in three-dimensional space based on a model of the site 104, in the model (step 508A). The initial model locations can be selected randomly, e.g., using a numerical pseudo-random generator, and/or using the initial locations represented by the initial locations data 234. If the movement of the moving markers 124 is not too great, using the initial locations rather than random initial locations can lead to a more rapid determination of the post-movement locations (e.g., due to convergence of an iterative solution).

Using the model locations, the locator module 226 generates model distances between markers 102, e.g., by taking the differences in three-dimensions in Cartesian space (step 510A).

The locator module 226 determines a distance difference (referred to as a distance "error") between each model distance and each corresponding measured distance represented by the post-movement data (step 512A).

The locator module 226 determines a total distance error based on a combination of the distance errors, e.g., by summing the magnitudes of the distance errors (step 513A).

In an example locations-from-distances process, the measured distances are determined for each communicating pair of markers, the model locations (corresponding to each emitting marker identifier) can be represented by three-dimensional Cartesian coordinates, and the total distance error can be the root mean square (RMS)—or quadratic mean—of the magnitudes of the individual distance errors.

The locator module 226 determines whether the end condition (also referred to as a "stop condition") has been met (step 514A). An example end condition is met when the total distance error is below a sufficient level, thus indicating that the model locations are sufficiently close to the measured locations. For example, the end condition can be an RMS distance error of less than 0.5 meters. Alternatively, or additionally, the end condition can represent a maximum number of iterations of the iterative steps of the modelling process, e.g., 500 or 1,000 times, which depends on the number of nodes. The maximum number of iterations provides an end condition if the total distance error is never sufficiently minimised.

If the end condition is met in step 514A, the locator module 226 stores the resulting model locations as the post-movement marker locations in the node location data 228 (step 520A).

If the end condition is not met as determined in step 514A, the locator module 226 repeats the process by selecting a new and different model location associated with one or more of the markers (step 516A). Each new model location is selected such that the distance errors associated with the distances in the post-move node spacing data 224 (i.e., the distances of the links 106 for which the transmitted signals have been recorded) are reduced: each old model location is moved by one or more update distances, wherein each update distance is based on the magnitude and the direction of each corresponding distance error associated with that model location. The update distance can be a fraction of the distance error, and the fraction can be proportional to the error.

In the example locations-from-distances process described hereinbefore, the new model locations (corresponding to each emitting marker identifier) are determined from the old model locations by vector addition of a fraction (20%) of the respective distance error.

The model locations of the markers can move substantially in step 516A, including the model locations of the anchor markers 120. Allowing virtual movement of the mode anchor marker locations can provide for a more rapid convergence of the iterative process to a minimum error solution than keeping the anchor marker locations fixed. However, after a selected number of iterations of the iterative process (e.g., 10 or 100 iterations), selected by a user based on empirical experience, the model anchor marker locations are moved towards the respective initial anchor locations (represented in the initial locations data 234), thus converging the model anchor locations to the measured anchor locations (step 518A).

The determination of the modelled distances in step 510A is repeated when the model locations have been virtually moved in steps 516A and 518A, until the error condition is met in step 514A.

In an example locator module 226, at least portions of the locations-from-distances process 500A are performed in accordance with instructions generated based on Matlab code.

Location Data Utilisation Process 600

In the location data utilisation process 600, the monitoring system 100 uses the generated node location data 228 to display and/or transmit information about the post-movement marker locations for users and operators of the monitoring system 100, and/or for associated plant equipment and apparatus.

Figure 8:
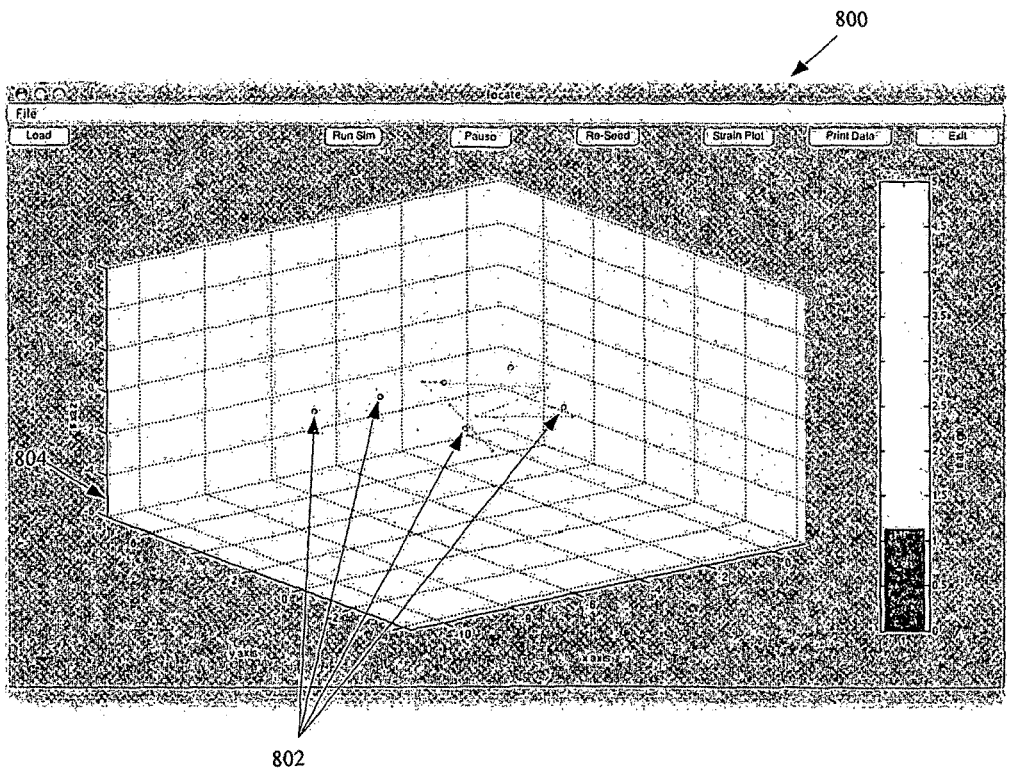
FIG. 8 is screenshot of a marker locations interface of the graphical user interface, used in the location data utilisation process.

In the location data utilisation process 600, the user interface module 232 accesses the node location data 228, and in some cases the processed node data 220 representing sensing data from the sensors 118A (step 602). The user interface module 232 uses the location data to generate a marker locations interface 800, including display locations 802 of the markers 102 in a three-dimensional graphical map 804, as shown in FIG. 8 (step 604). The user interface module 232 can access geological data representing the locations of ore bodies, and display the ore boundary locations in association with the display locations 802 (step 608). The computing machine 110 can transmit or send data representing the node location data 228 to management and control systems, e.g., to other mining apparatus, devices, and analysis systems in a mining environment (step 610).

In addition to generation of the transmission signals in the network of the markers 102, each device 100A can emit signals that are detected by plant equipment as the ground is excavated. For example, in a mining application, signals emitted by each marker can indicate marker location, and thus generate an indication of a flow of the markers, and thus the associated ore, through the plant equipment (step 612). Due to the network of nodes, the markers 102 can measure and indicate flow within a stope directly and beyond the range of a static detector (e.g., the base station 108) located on the mining equipment. The markers 102 may have sufficient battery power to continue to transmit at this stage, or may be detected as passive tags (e.g., due to their magnetic or electronic properties, such as passive radio-frequency identifiers). The data representing movement of the markers 102 at this stage can be used in mine software packages to allow analysis of material flow.

Example Device 900

Figure 9A:
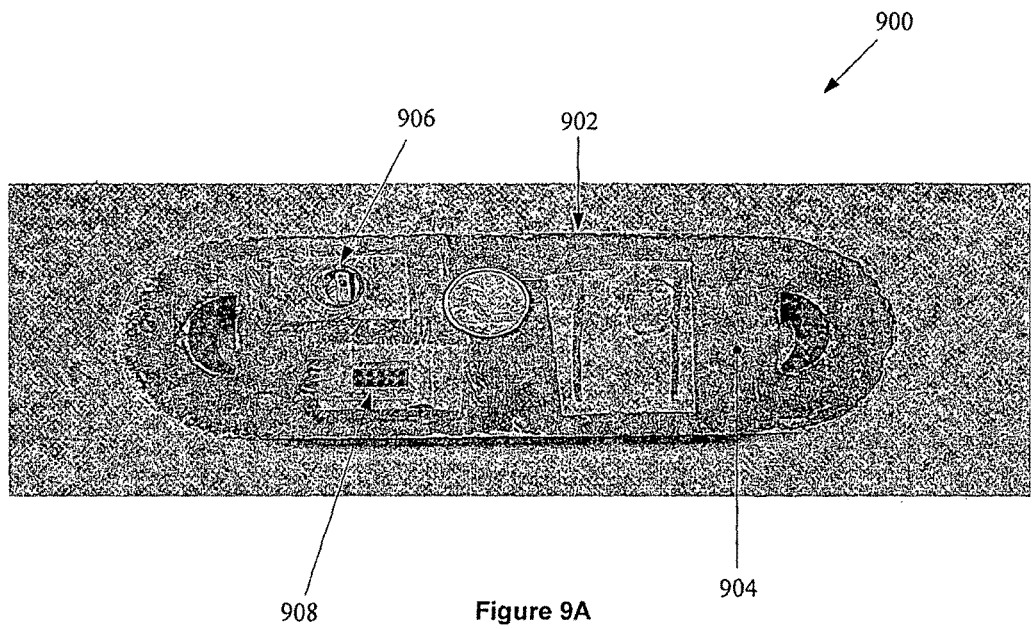
FIGS. 9A and 9B are photographs of an example device providing an example marker of the monitoring system.
Figure 9B:
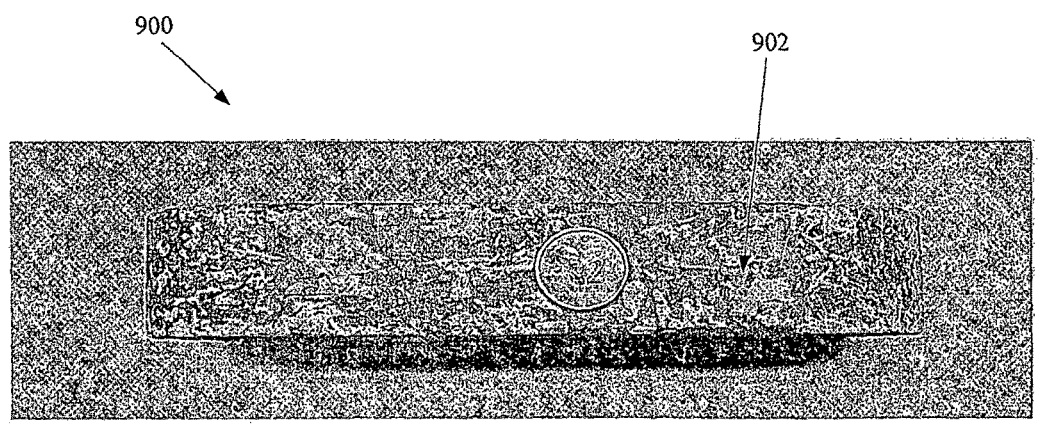

In an example monitoring system, each of the markers 102 is provided by an example device 900, which includes an optional hard outer casing 902 and an epoxy or resin filler 904. The epoxy can be cast in a solid mass using a silicone mould, as shown in FIGS. 9A and 9B. The example device 900 may include an externally accessible on-and-off switch 906 and an externally accessible port 908 for directly communicating with the control circuits 106A of the example device 900, e.g., for testing purposes.

Figure 10A:
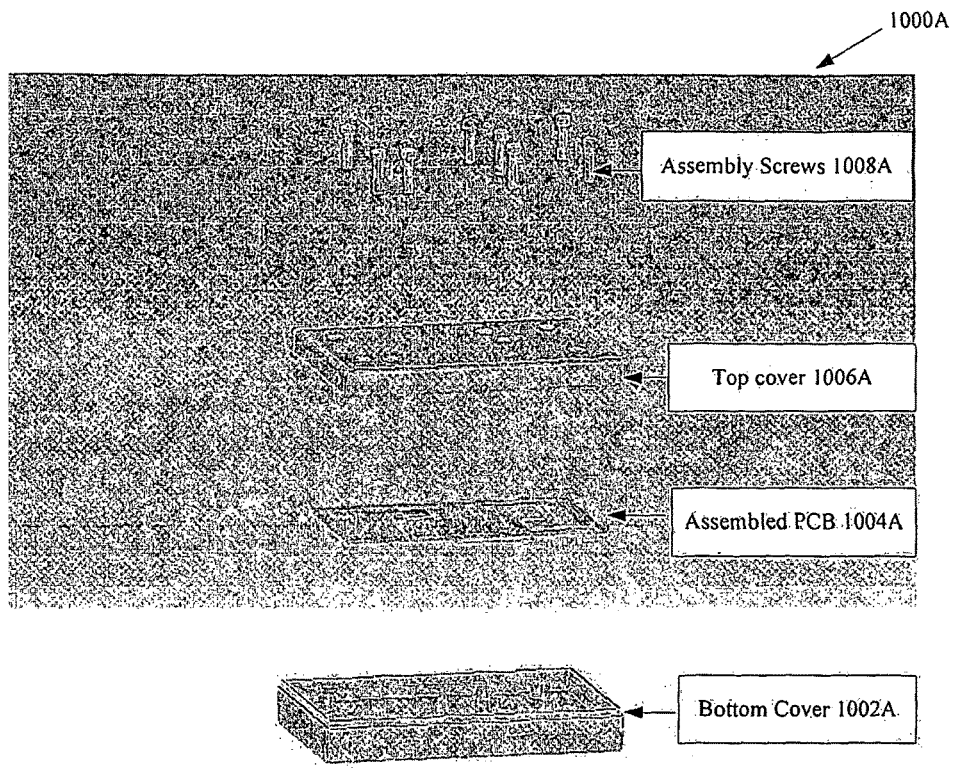
FIGS. 10A and 10B are exploded schematic diagrams of device assemblies of example devices in the monitoring system.
Figure 10B:
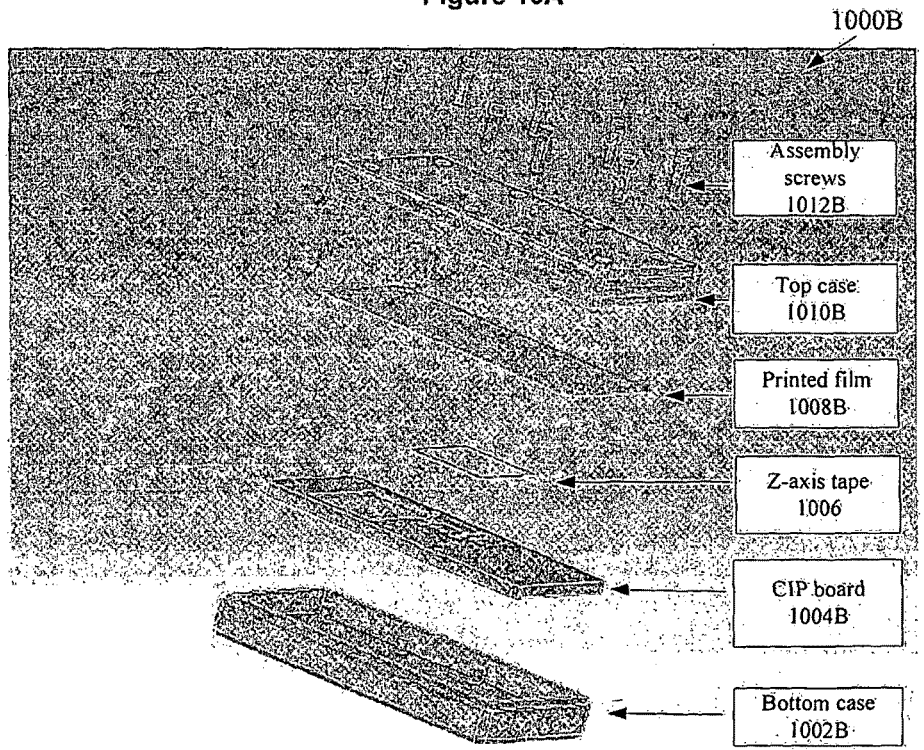

An example device can include a printed circuit board (PCB) device assembly 1000A, or a circuit-in-plastic (CIP) device assembly 1000B. The PCB device assembly 1000A includes a bottom cover 1002A and a top cover 1006A, with an assembled printed circuit board (PCB) 1004A fastened between the two covers 1002A, 1006A using a plurality of assembly screws 1008A, as shown in FIG. 10A. The circuit-in-plastic (CIP) device assembly 1000B includes a circuit-in-plastic (CIP) board 1004B attached to a printed film 1008B by a z-axis tape 1006B, and the board and film 1004B, 1008B are fastened between and in a bottom case 1002B and a top case 101013 by a plurality of assembly screws 1012B, as shown in FIG. 10B, or using heat pressing instead of the screws 1012B. The electronic components 103A of each device 100A can be provided by the assembled PCB 1004A, or the combination of the CIP board 1004B and the printed film 1008B.

Figure 11A:
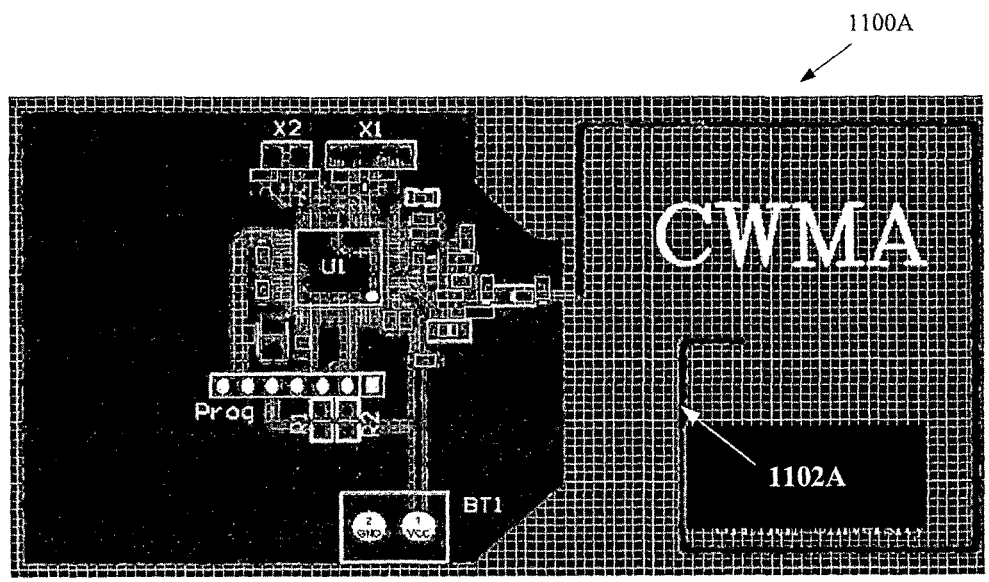
FIG. 11A is an image of an example circuit board layout of a circuit in the device in the monitoring system.

Example electronic components of one or more of the markers 102 can be configured according to an example circuit board layout 1100A, which includes a planar loop antenna 1102A in the plane of the circuit board layout, and a plurality of locations for example electronic components, as shown in FIG. 11A.

Figure 11B:
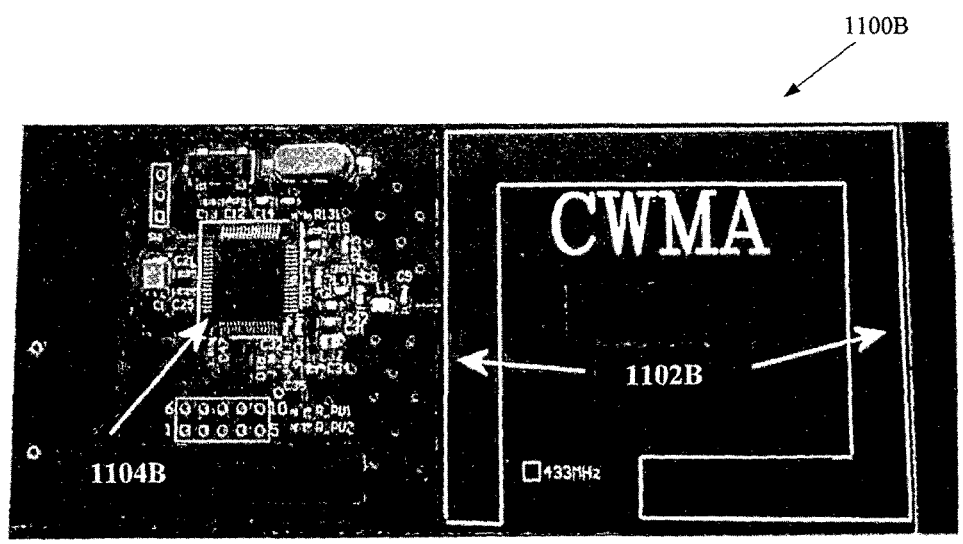
FIG. 11B is a photograph of an example circuit board in the device in the monitoring system.

An example circuit board 1100B, which can support and connect example electronic components of the device 100A, includes a planar loop antenna 1102B, configured to emit and receive propagating waves of electromagnetic signals with frequencies of about 433 MHz, electrically connected to a circuit which includes an example processor 1104B, as shown in FIG. 11B. A frequency of 433 MHz can be selected as it is an unlicensed band and radio-frequency (RF) chips are commercially available which operate in this range; signals at lower frequencies have fewer issues with transmission through solid media such as rock, but lower frequency antennas may be too large for inclusion in the markers 102.

Figure 12:
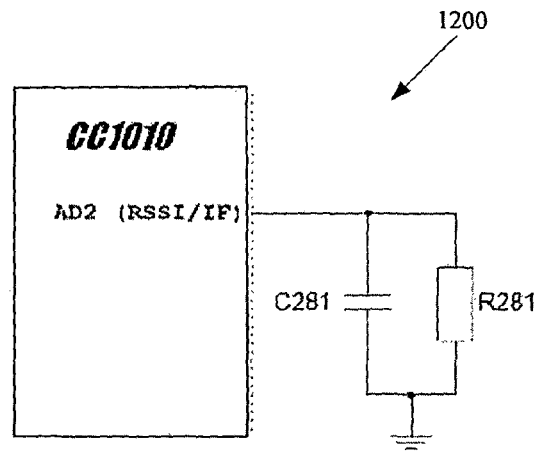
FIG. 12 is a circuit diagram of an example receiver circuit of the device in the monitoring system.
Figure 13:
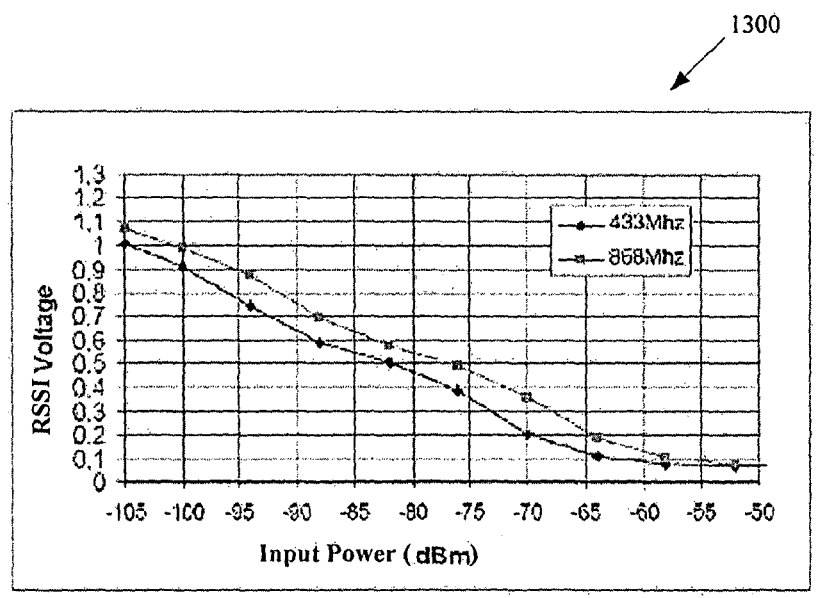
FIG. 13 is an example voltage relationship of voltage in the example receiver circuit as a function of input power.

The electronic components 103A of each device 100A can include an example receiver circuit 1200 for monitoring the average power of the received signal. The example receiver circuit 1200 can include a resistor R281 and capacitor C281 connected in parallel between an electrical ground (or earth) connection and an analogue-to-digital converter pin AD2 of a microprocessor CC1010, as shown in FIG. 12. The resistor R281 and the capacitor C281 may be used to balance the antenna's impedance. The AD2 pin detects the level of received signal strength, based on a Receive Signal Strength Indicator (RSSI). For the 433-MHz planar antenna 1102B, the value of C281 is about zero to 30 pico-Farad In an experiment using the example receiver circuit 1200, the voltage detected at the AD2 pin (referred to as the "RSSI voltage") had an experimental voltage relationship 1300 in which the RSSI voltage (in volts) had an approximately linear relationship to the input power (in decibels normalised to 1 milliwatt, or "dBm"), as shown in FIG. 13. The input power was the propagating electromagnetic power received at the experimental transducer at frequencies of 433 MHz and 868 MHz, shown respectively as black diamonds and grey squares in FIG. 13.

Example Marker Locations

Figure 14:
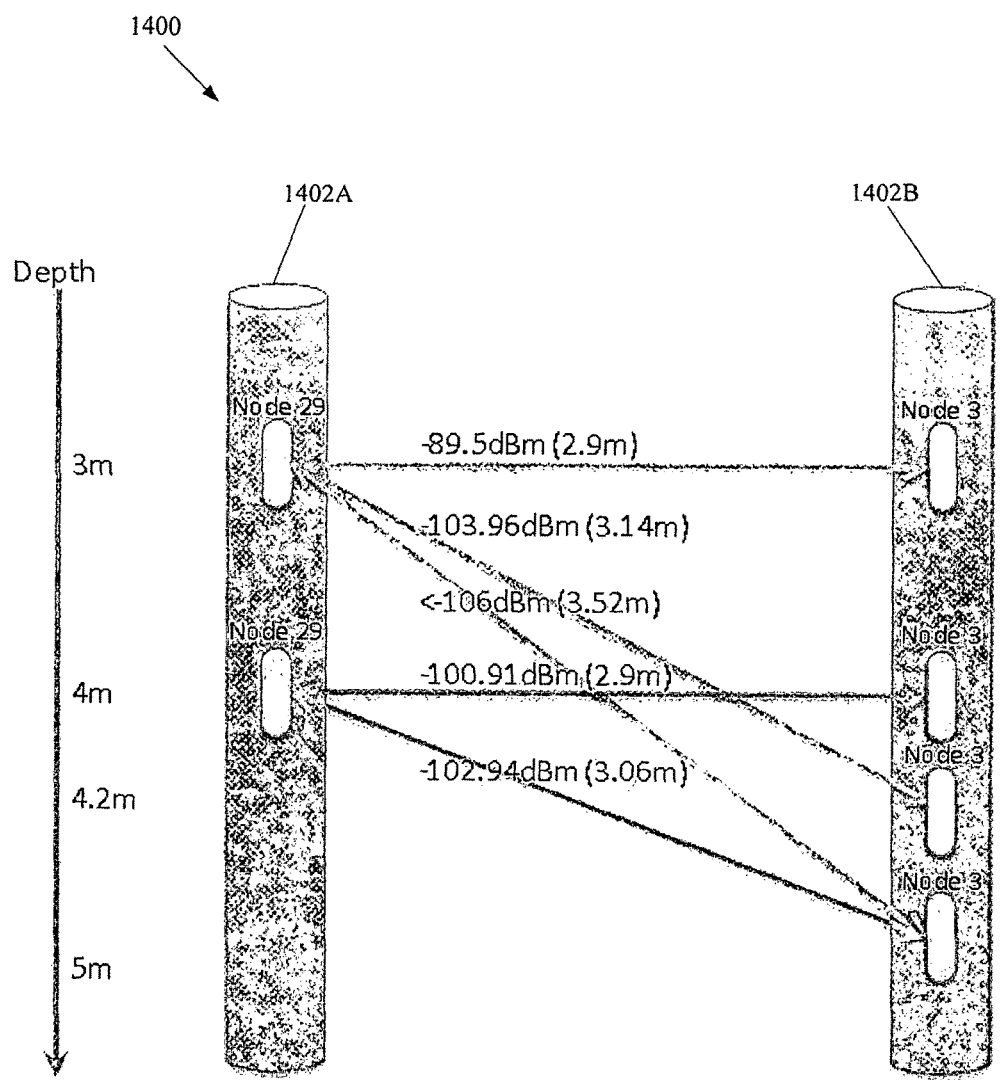
FIG. 14 is a schematic diagram of experimental markers in an example of the monitoring system.

In an experimental example, a plurality of experimental markers 1400 was placed in two holes 1402A, 1402B in the ground. A plurality of markers at different depths were simulated using two markers ("Node 29" and "Node 3") in two holes suspended by ropes at different relative positions, as shown in FIG. 14.

Example Computing System 1500

Figure 15:
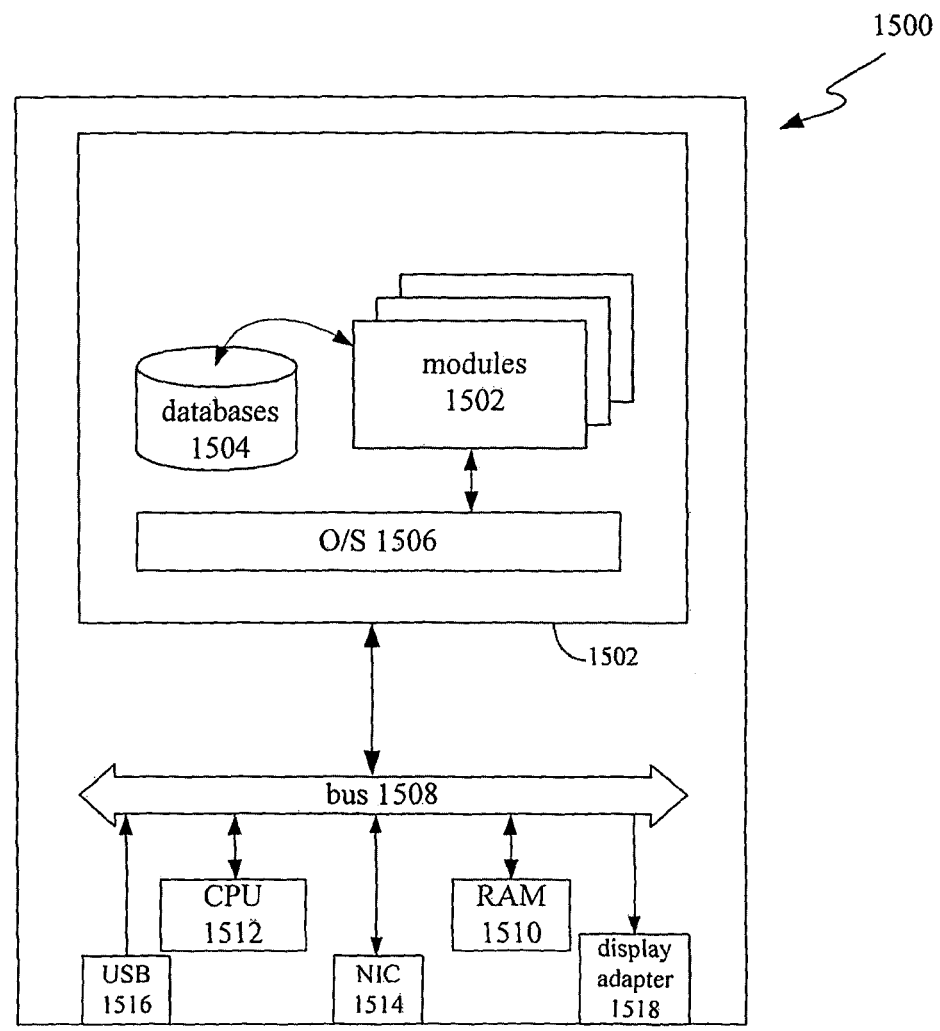
FIG. 15 is a block diagram of an example computing system in the monitoring system.

The computing machine 110 can include an example computing system 1500, which includes the monitoring modules 202 in modules 1502 and the data structures 204 in one or more databases 1504 in its non-volatile computer readable storage (in the form of at least one hard disc drive 1502), as shown in FIG. 15.

The computing system 1500 can be a commercially available personal computer or server computer system based on a 32-bit or 64-bit Intel architecture. The modules 1502 are stored as programming instructions of one or more software components that access routines of an operating system (O/S) 1506. Alternatively or additionally, at least parts of the modules 1502 can be implemented as one or more dedicated hardware components, such as application-specific integrated circuits (ASICs) and/or field programmable gate arrays (FPGAs).

The computer system 1500 includes at least one or more of the following commercially available computer components, all interconnected by a data bus 1508:
 (1) random access memory (RAM) 1510;
 (2) at least one computer processor 1512;
 (3) a network interface connector (NIC) 1514 which connects the computer system 1500 to data communications networks (e.g., a communications network of the operators, or the Internet); and
 (4) user interface connections, including at least one universal serial bus (USB) interface 1516 (for receiving operator or user input via a keyboard, or mouse, etc.) and a display adapter 1518 (for displaying display data via a display device such as a liquid-crystal display device).

The computer system 1500 includes a plurality of commercially available software modules, including the operating system (O/S) 1506 (e.g., Linux or Microsoft Windows).

The boundaries between the modules and components in the modules 1502 are exemplary, and alternative embodiments may merge modules or impose an alternative decomposition of functionality of modules. For example, the modules can be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure and configuration of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), etc. Furthermore, each of the blocks of the flow diagrams of the processes of the modules 1502 may be executed by a portion of a module. The processes may be embodied in a machine-readable and/or computer-readable medium for configuring a computer system to execute the method. The software modules may be stored within and/or transmitted to a computer system memory to configure the computer system to perform the functions of the module.

The modules 1502 are normally processed according to a program (a list of internally stored instructions such as a particular application program and/or an operating system)

and produce resultant output information via input/output (I/O) devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Alternative Monitoring Systems

In some monitoring systems, the analogue signal properties and/or the digital signal data can represent the directions (e.g., based on each signal's direction of arrival or "DOA") from which the transmitting signals are received (e.g., using sensors or antennas with high directivity), and thus the locations of the emitting markers can be determined by triangulation using signals from each emitting marker received by a plurality of receiving markers with angle-sensitive receivers. The process can include monitoring rotation of each marker (e.g., using gyroscope sensors) to determine relative directions between communicating markers based on the measured rotation. Each marker can record data representing its angular position in three dimensions, and this data can be used by the marker to determine the DOA of received signals relative to a common coordinate system.

In some monitoring systems, the transmitted signals can be seismic signals generated by the markers, generated by components of the markers, generated by sources associated with the markers (e.g., sources containing the markers), and/or generated by separate sources (e.g., external sources such as detonators, or sources of impact in or on the ground such as concussive sources like lightning strikes).

Interpretation

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The invention claimed is:

1. A process for locating underground markers, including:
   transmitting signals through ground between the underground markers in ground, wherein the underground markers are arranged to form nodes in an ad hoc communications network in which each underground marker is configured to communicate with at least one other underground marker;
   receiving, by at least one of the underground markers, the transmitted signals, and determining, by at least one of the underground markers, received signal properties of the transmitted signal, including signal strengths or signal transmission times;
   determining locations of the underground markers within the ad hoc communications network based on the transmitted signals,
   wherein determining the locations of the underground markers within the ad hoc communications network includes:
   determining distances between the underground markers based on the received signal properties of the transmitted signal, including the signal strengths or the signal transmission times;
   using trilateration based on the determined distances;
   selecting modelled distances between the modelled locations;
   determining an error between each modelled distance and each corresponding determined distance;
   selecting a different modelled location for each modelled location that reduces one or more corresponding errors; and
   generating and storing in a memory or displaying on a display device a three-dimensional map of the determined locations of the underground markers.

2. The process of claim 1, wherein the end condition includes a minimum value for the errors, and/or wherein the end condition includes a maximum number of iterations of the repeating.

3. The process of claim 1, wherein the determining of the locations includes determining directions between the underground markers based on respective received signal properties of the transmitted signals, including signal directions, and using triangulation based on the determined directions.

4. The process of claim 1, wherein the transmitted signals represent marker movements of the underground markers, and determining each location uses a pre-movement location and the underground marker movement of each underground marker.

5. The process of claim 1, wherein the transmitted signals represent:
   geo-location data representing a location of each underground marker in a coordinate system of a site or of a global positioning system (GPS), and determining each location includes using the geo-location data; and/or
   displacement data representing displacement of the underground markers, and determining the location of each underground marker includes using the displacement data.

6. The process of claim 1, wherein the determining of the locations of the underground markers includes identifying one or more of the underground markers using the transmitted signals, wherein each transmitted signal represents an identifier of a corresponding transmitting marker of the underground markers.

7. The process of claim 1, wherein determining the locations includes using anchor locations of anchor markers of the underground markers,
   wherein the anchor locations are selected based on where negligible ground movement occurs, and
   wherein the anchor locations are used as preferred modelled locations in a device locating process.

8. The process of claim 1, including:
   transmitting test signals through ground between the underground markers in ground at selected test locations; and
   determining values of selected ground properties based on: received test signal properties of the transmitted test signals; and the selected test locations,
   wherein determining the locations includes using the values of the selected ground properties,
   wherein determining the values of the selected ground properties includes determining statistical values of the ground properties using a plurality of the received test signals corresponding to different times of receiving, and/or different locations in ground, wherein the statistical values include average ground properties values and/or median ground properties values.

9. The process of claim 1, including at least one emitting marker of the underground markers selecting an emitter power level of a transmitted signal to provide a received power level less than a saturated power level for a corresponding receiving marker.

10. The process of claim 9, wherein selecting the emitter power level includes the at least one emitting marker receiving a feedback signal from the corresponding receiving marker if the received power level is not less than the saturated power level.

11. The process of claim 1, including:
one or more of the underground markers entering a sleep mode before transmitting the transmitted signals;
transmitting an activation signal between the underground markers through ground; and
the underground markers in the sleep mode exiting the sleep mode in response to receiving the activation signal.

12. The process of claim 1, including:
generating a three-dimensional display of the locations for a graphical user interface (GUI);
receiving sensor data representing temperatures, pressures, accelerations, geo-location coordinates, and/or pH levels measured by one or more sensors of at least one of the underground markers using the transmitted signals;
receiving location data representing the determined locations, and using the location data during excavation, including generating an indication of a marker location for an operator of a digger based on the location data; and/or
generating an indication of a flow of rock through plant equipment based on the underground markers emitting signals.

13. A process for monitoring ground movement, including:
accessing data representing pre-movement locations of underground markers;
accessing data representing post-movement locations of the underground markers generated using the process of claim 1; and
generating movement data representing movement of the underground markers based on differences between the pre-movement locations and the respective post-movement locations.

14. The process of claim 13, wherein the generated movement data are used for monitoring ore movement during blasting, and wherein the pre-movement locations are adjacent edges of ore bodies.

15. The process of claim 13, including determining the pre-movement locations using transmission of pre-movement test signals between the underground markers.

16. A system for locating underground markers including:
at least one pair of the underground markers configured to transmit at least one signal between the underground markers through ground;
one of the pair of the underground markers configured to receive the transmitted signals, and to determine received signal properties of the transmitted signals, including signal strengths or signal transmission times; and
at least one computing device configured to determine locations of the underground markers in ground based on the at least one transmitted signal,
wherein the underground markers form nodes in an ad hoc communications network,
wherein the at least one computing device is configured to determine the location of the underground markers by:
determining distances between the underground markers based on the received signal properties of the transmitted signals, including the signal strengths or the signal transmission times;
using trilateration based on the determined distances;
selecting a modelled location corresponding to each underground marker;
determining modelled distances between the modelled locations;
determining an error between each modelled distance and each corresponding determined distance;
selecting a different modelled location for each modelled location that reduces the one or more corresponding errors; and
repeating the determination of the modelled distances, the determination of the errors, and the selection of the different modelled locations until an end condition is satisfied.

17. The system of claim 16, wherein each underground marker includes a communications transceiver, a microcontroller and computer-readable storage.

18. The system of claim 16, including a base station with:
a transceiver configured to send and to receive data to and from at least one of the underground markers; and
a data communications interface configured to send data to, and to receive data from, the computing device.

19. The system of claim 16, wherein the end condition includes a minimum value for the errors, and/or wherein the end condition includes a maximum number of iterations of the repeating.

* * * * *